(12) United States Patent
Lee et al.

(10) Patent No.: US 12,469,267 B2
(45) Date of Patent: Nov. 11, 2025

(54) ADVANCED DRIVER ASSISTANCE SYSTEM, AND VEHICLE HAVING THE SAME

(71) Applicants: Hyundai Motor Company, Seoul (KR); Kia Corporation, Seoul (KR)

(72) Inventors: Joon Ho Lee, Seoul (KR); Dong Hyun Sung, Hwaseong-Si (KR); Yongseok Kwon, Suwon-Si (KR); Tae-Geun An, Yeongju-Si (KR); Hyoungjong Wi, Seoul (KR); Eungseo Kim, Gwacheon-Si (KR); Sangmin Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 549 days.

(21) Appl. No.: 18/079,692

(22) Filed: Dec. 12, 2022

(65) Prior Publication Data

US 2023/0316735 A1    Oct. 5, 2023

(30) Foreign Application Priority Data

Mar. 30, 2022   (KR) .......................... 10-2022-0039440

(51) Int. Cl.
*G06V 20/58*    (2022.01)
*B60R 11/04*    (2006.01)
(Continued)

(52) U.S. Cl.
CPC ............ *G06V 10/803* (2022.01); *B60R 11/04* (2013.01); *B60W 30/08* (2013.01); *G01S 13/931* (2013.01);
(Continued)

(58) Field of Classification Search
CPC .. G06V 10/803; G06V 10/762; G06V 10/811; G06V 20/58; B60R 11/04;
(Continued)

(56) References Cited

U.S. PATENT DOCUMENTS

2018/0281680 A1*  10/2018  Gerardo Castro .... B60W 50/14
2020/0082181 A1*   3/2020  Li ............................ G06T 11/20
2021/0197807 A1*   7/2021  Park .................... B60W 40/105

FOREIGN PATENT DOCUMENTS

CN    112835030 A  *  5/2021  ........... G01S 13/867
CN    113077520 A  *  7/2021  ............. G06N 3/045
(Continued)

*Primary Examiner* — Carol W Chan
(74) *Attorney, Agent, or Firm* — Morgan Lewis & Bockius LLP

(57) ABSTRACT

An advanced driver assistance system (ADAS) and a vehicle including the same include a camera; a plurality of distance detectors; a braking device; and a processor configured to recognize a fusion track and a plurality of single tracks based on obstacle information recognized by the camera and obstacle information recognized by at least one of the plurality of distance detectors, upon determining that the fusion track is present, obtain a cluster area in a stationary state and a cluster area in a moving state based on movement information and reference position information of the fusion track and movement information and position information of each of the single tracks, determine a possibility of collision based on the obtained cluster area, and control the braking device in response to the determined possibility of collision.

20 Claims, 13 Drawing Sheets

(51) Int. Cl.
   *B60W 30/08*   (2012.01)
   *G01S 13/931*   (2020.01)
   *G06V 10/762*   (2022.01)
   *G06V 10/80*   (2022.01)

(52) U.S. Cl.
   CPC ............ *G06V 10/762* (2022.01); *G06V 20/58* (2022.01); *B60W 2554/00* (2020.02)

(58) Field of Classification Search
   CPC ....... B60W 2554/00; B60W 2420/403; B60W 2420/408; B60W 2420/54; B60W 30/09; B60W 30/08; B60W 30/0956; B60W 2552/50; B60W 10/18; B60W 40/02; B60W 2050/0005; G01S 15/931; G01S 2013/9315; G01S 2013/93271; G01S 2013/93274; G01S 2013/9318; G01S 2013/93185; G01S 2013/9319; G01S 2013/93272; G01S 13/42; G01S 13/862; G01S 13/726; G01S 13/931; G01S 13/865; G01S 13/867; G01S 13/87; H04N 23/00
   See application file for complete search history.

(56) References Cited

FOREIGN PATENT DOCUMENTS

| | | |
|---|---|---|
| KR | 10-2018-0065585 A | 6/2018 |
| KR | 10-2018-0066524 A | 6/2018 |

\* cited by examiner

★ SINGLE TRACK
☐ FUSION TRACK
▨ CLUSTER AREA

ADVANCED DRIVER ASSISTANCE SYSTEM, AND VEHICLE HAVING THE SAME

CROSS-REFERENCE TO RELATED APPLICATION

The present application claims priority to Korean Patent Application No. 10-2022-0039440, filed on Mar. 30, 2022, the entire contents of which is incorporated herein for all purposes by this reference.

BACKGROUND OF THE PRESENT DISCLOSURE

Field of the Present Disclosure

The present disclosure relates to an advanced driver assistance system for preventing collision with an obstacle, and a vehicle having the same.

Description of Related Art

Recently, there have been development on various types of advanced driver assistance system (ADAS) that are designed to inform a driver of travel information related to a vehicle to prevent an accident from occurring due to driver's inattentiveness and perform autonomous travelling for driver's convenience.

One example of the ADAS is a technology for detecting an obstacle around a vehicle by installing a distance sensor on the vehicle and warning the driver of the obstacle.

Another example of the ADAS is a technology for autonomously travelling to a destination based on road information and current position information, while detecting an obstacle and avoiding the detected obstacle to autonomously drive toward the destination.

ADAS detects an obstacle using a camera or various sensors provided in the vehicle. In ADAS, when the positions of obstacles detected by cameras or various sensors become adjacent to the vehicle body, it is difficult to perform sensor fusion on each detected obstacle, which causes a difficulty in generating a fusion track for each of the obstacles.

Accordingly, in the existing ADAS, the accuracy of detecting an obstacle and the accuracy of determining a collision are low, and it is difficult to perform collision warning and collision avoidance control, and thus the vehicle may not stably travel.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an advanced driver assistance system (ADAS) for obtaining a cluster area of a plurality of obstacles and recognizing an obstacle based on the obtained cluster area, and a vehicle including the same.

The present disclosure may provide an advanced driver assistance system (ADAS) for recognizing a cluster obstacle based on movement information of a plurality of obstacles, and a vehicle having the same.

The technical objectives of the present disclosure are not limited to the above, and other objectives may become apparent to those of ordinary skill in the art based on the following descriptions.

According to an aspect of the present disclosure, there is provided an advanced driver assistance system (ADAS) including: a communicator configured to communicate with a camera and a plurality of distance detectors; and a processor configured to determine whether a fusion track is present based on obstacle information recognized by the camera and obstacle information recognized by at least one of the plurality of distance detectors; upon concluding that the fusion track is present, generate a gate area of the fusion track based on movement information of the fusion track and reference position information of the fusion track; generate a cluster area based on the gate area of the fusion track, position information of a plurality of single tracks, and movement information of the plurality of single tracks; and determine a possibility of collision based on the obtained cluster area.

The processor may be configured to determine whether the fusion track is in a stationary state based on the movement information of the fusion track, and upon concluding that the fusion track is in the stationary state, generate the gate area of the fusion track based on first reference gate size information.

The processor may be configured to: upon concluding that the fusion track is in the stationary state, recognize single tracks in the stationary state based on the movement information of the plurality of single tracks; based on the position information of the recognized single tracks in the stationary state and the reference position information of the fusion track, recognize at least one single track which is present in a range less than or equal to a reference distance from the fusion track; and obtain the cluster area based on position information of the recognized at least one single track.

The processor may be configured to: based on the position information of the recognized at least one single track, generate a gate area of the recognized at least one single track; generate a line connecting a corner of the gate area of the fusion track and a corner of the gate area of the at least one single track that are provided adjacent to each other; and obtain the cluster area using the generated line as a boundary.

The processor may be configured to determine cluster validity for the at least one single track based on whether the at least one single track at a first time point is a same as the at least one single track at a second time point, and a change in distance between the fusion track and the at least one single track corresponding to a change in time from the first time point to the second time point, wherein the second time point may be a time at which a predetermined time period has elapsed from the first time point.

The processor may be configured to: determine whether the fusion track is in a moving state based on the movement information of the fusion track; upon concluding that the fusion track is in the moving state, obtain first gate size information and second gate size information based on a velocity in a first direction of the fusion track, a velocity in a second direction of the fusion track, and first reference gate size information; generate a first gate area based on the obtained first gate size information, and generate a second gate area based on the obtained second gate size information.

The processor may be configured to: upon concluding that the fusion track is in the moving state, identify single tracks located within the first gate area based on the position information of the plurality of single tracks; and based on the movement information of the single tracks within the first gate area, a velocity of the fusion track in a first direction, and the generated first gate area, recognize a first single track, of which a velocity difference from the fusion track is less than or equal to a first reference velocity, among the single tracks in the moving state within the first gate area.

The processor may be configured to: upon concluding that the fusion track is in the moving state, identify single tracks located within the second gate area based on the position information of the plurality of single tracks; and based on the movement information of the single tracks within the second gate area, a velocity of the fusion track in a second direction, and the generated second gate area, recognize a second single track, of which a velocity difference from the fusion track is less than or equal to a second reference velocity, among the single tracks in the moving state within the second gate area.

The processor is configured to: generate a gate area of the first single track and a gate area of the second single track; and generate a line connecting an corner of the gate area of the fusion track and an corner of the gate area of the first single track that are provided adjacent to each other, and generate a line connecting a corner of the gate area of the fusion track and a corner of the gate area of the second single track that are provided adjacent to each other, to obtain the cluster area.

The processor may be configured to: upon concluding that there is no fusion track, set a track recognized by the camera among the plurality of single tracks as a reference single track; determine whether the reference single track is in a stationary state based on movement information of the reference single track; and upon concluding that the reference single track is in the stationary state, generate a gate area of the reference single track based on reference position information of the reference single track and reference gate size information of the reference single track.

The processor may be configured to: upon concluding that the reference single track is in the stationary state, recognize single tracks in the stationary state based on movement information of remaining single tracks; based on the position information of the recognized single tracks in the stationary state and the reference position information of the reference single track, recognize at least one single track which is present in a range less than or equal to a reference distance from the reference single track; and obtain the cluster area based on position information of the recognized at least one single track.

The processor may be configured to: based on the position information of the recognized at least one single track, generate a gate area of the recognized at least one single track; generate a line connecting a corner of the gate area of the reference single track and a corner of the gate area of the at least one single track that are provided adjacent to each other; and obtain the cluster area using the generated line as a boundary.

The processor may be configured to determine cluster validity for the at least one single track based on whether the at least one single track at a first time point is a same as the at least one single track at a second time point, and a change in distance between the reference single track and the at least one single track corresponding to a change in time from the first time point to the second time point, wherein the second time point may be a time at which a predetermined time period has elapsed from the first time point.

The processor may be configured to: determine whether the referenced single track is in a moving state based on the movement information of the referenced single track; and upon concluding that referenced single track is in the moving state, generate the gate area of the reference single track based on a velocity in a first direction of the reference single track, a velocity in a second direction of the referenced single track, and the second reference gate size information.

The processor may be configured to: upon concluding that the reference single track is in the moving state, identify single tracks in a moving state based on the movement information of the remaining single tracks; and based on position information of the identified single tracks in the moving state, recognize single tracks in a moving state, which are located within the gate area of the reference single track, among the identified single tracks in the moving state.

The processor may be configured to: based on the movement information of the recognized single tracks in the moving state and the movement information of the reference single track, recognize a single track in the moving state, of which a velocity difference from the reference single track is less than or equal to a reference velocity, among the recognized single tracks in a moving state single track; and generate a gate area of the recognized single track in a moving state.

The processor may be configured to generate a line connecting a corner of the gate area of the reference single track and a corner of the gate area of the recognized single track in the moving state that are adjacent to each other, to obtain the cluster area.

The processor may be configured to, based on whether the recognized single track in a moving state at a first time point is the same as the recognized single track in a moving state at a second time point, and a change in distance between the reference single track and the recognized single track in the moving state corresponding to a change in time from the first time point to the second time point, determine cluster validity for the recognized single track in the moving state, wherein the second time point may be a time at which a predetermined time period has elapsed from the first time point.

According to an aspect of the present disclosure, there is provided a vehicle including: a camera; a plurality of distance detectors; a braking device; and a processor configured to: recognize a fusion track and a plurality of single tracks based on obstacle information recognized by the camera and obstacle information recognized by at least one of the plurality of distance detectors; upon concluding that the fusion track is present, obtain a cluster area in a stationary state and a cluster area in a moving state based on movement information and reference position information of the fusion track and movement information and position information of each of the single tracks; and determine a possibility of collision based on the obtained cluster area, wherein the processor is configured to, upon concluding that the fusion track is present, generate a gate area of the fusion track, generate a gate area of at least one single track among the plurality of single tracks based on the gate area of the fusion track, and obtain the cluster area using the gate area of the fusion track and the gate area of the at least one single track, and upon concluding that the fusion track is not present, set a single track recognized by the camera among the plurality of single tracks as a reference single track, generate a gate area of the reference single track, generate gate areas of remaining at least one single track among the plurality of single tracks based on the gate area of the reference single track, and obtain the cluster area using the gate area of the reference single track and the gate area of the remaining at least one single track.

The processor may be configured to, based on whether the at least one single track at a first time point is the same as the at least one single track at a second time point, and a change in distance between the fusion track and the at least one single track corresponding to a change in time from the first time point to the second time point, determine cluster validity for the at least one single track, wherein the second time point may be a time at which a predetermined time period has elapsed from the first time point.

The processor may be configured to, based on whether the remaining at least one single track at a first time point is the same as the remaining at least one single track at a second time point, and a change in distance between the reference single track and the remaining at least one single track corresponding to a change in time from the first time point to the second time point, determine cluster validity for the remaining at least one single track, wherein the second time point may be a time at which a predetermined time period has elapsed from the first time point.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
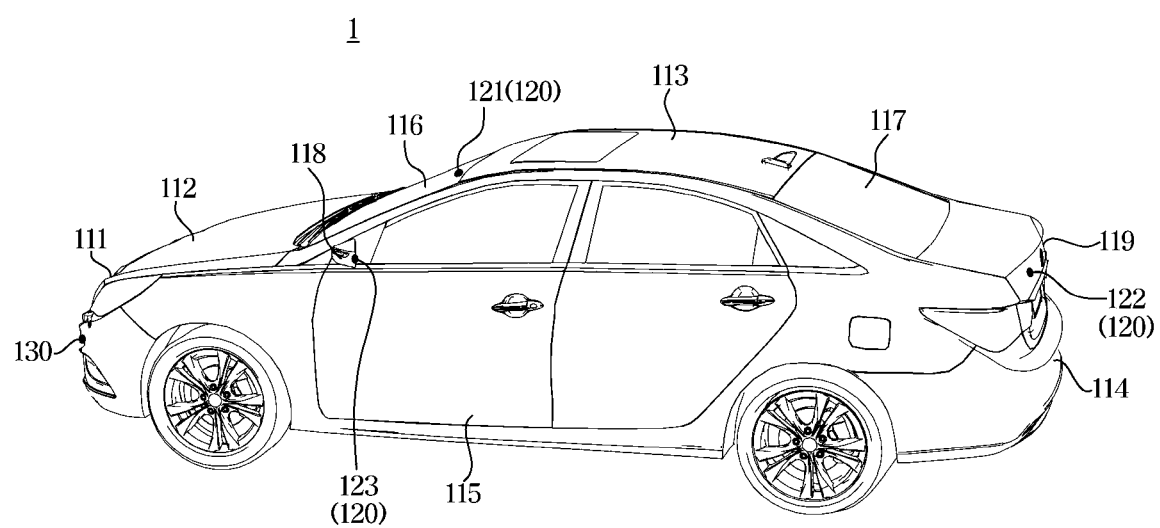
FIG. 1 is a diagram illustrating an example of a vehicle body according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a diagram illustrating an example of a vehicle body according to an exemplary embodiment of the present disclosure.

A vehicle 1 includes a body including an interior and an exterior, and a chassis which is a portion of the vehicle 1 except for the body, in which mechanical devices required for traveling are provided.

The exterior of the body includes a front panel 111, a bonnet 112, a roof panel 113, a rear panel 114, a plurality of doors 115 provided to open or close the indoor space, and window glasses (referred to as windows) provided on the plurality of doors 115 to be openable or closable.

The vehicle 1 may include a front windshield glass 116 provided on the front side of the vehicle 1 and a rear windshield glass 117 provided on the rear side of the vehicle 1.

The vehicle 1 may include a side mirror 118 which is provided on the door 115 on the front side of the vehicle 1 for the driver to secure a rear view of the vehicle 1 and a left/right side and rear view of the vehicle 1, The vehicle 1 includes a tailgate 119 for opening and closing a trunk that forms a space for storing luggage, and a lamp for facilitating easy viewing of information related to a surrounding of the vehicle 1 while keeping an eye on the front, and performing signaling and communication functions to other vehicles and pedestrians.

The vehicle 1 may include an image acquirer 120 for obtaining an image of the surroundings.

The image acquirer 120 may include one or two or more cameras.

Each of the cameras may include a plurality of lenses and an image sensor. The image sensor may include a plurality of photodiodes for converting light into electrical signals, and the plurality of photodiodes may be arranged in a two-dimensional matrix.

The camera may include a charge-coupled device (CCD) or a complementary metal-oxide semiconductor (CMOS) image sensor, and may include a 3D spatial recognition sensor, such as a KINECT (RGB-D sensor), a TOF (Structured Light Sensor), or a stereo camera.

In an exemplary embodiment of the present disclosure, the image acquirer 120 may include a plurality of cameras 121, 122, and 123 including a first camera 121, a second camera 122 and a third camera 123 that have fields of view respectively directed to the front, left and right sides, and rear of the vehicle 1.

The first camera 121 may obtain a road image corresponding to the front area of the vehicle 1. In the instant case, the first camera 121 may be provided on the front windshield glass 116 or on the front panel 111.

The first camera 121 may be provided on a rear view mirror inside the vehicle 1 or may be provided on a roof panel to be exposed to, the, the outside thereof, and may be provided on a grille of the front side of the vehicle 1 or an emblem of the front side of the vehicle. The field of view of the first camera 121 provided on the roof panel 113 may be the front of the vehicle 1.

The second camera 122 may obtain a road image corresponding to the rear area of the vehicle 1. In the instant case, the second camera 122 may be provided on the rear windshield glass 117 to have a field of view which is directed to the outside of the vehicle 1, and may be provided on the rear panel 114 or on the tail gate 119.

The second camera 122 may be provided on a license plate on the rear side of the vehicle 1, an emblem on the rear side of the vehicle 1 or the roof panel 113 to be exposed to the outside. The field of view of the second camera 122 provided on the roof panel 133 may be the rear of the vehicle 1.

The third camera 123 may obtain a road image corresponding to the left side area of the vehicle 1. In the instant case, the third camera 123 may be provided on the side mirror 118 on the left side of the vehicle 1.

The fourth camera (124, in FIG. 2) may obtain a road image corresponding to the right side area of the vehicle 1. In the instant case, the fourth camera 124 may be provided on the side mirror 118 on the right side of the vehicle 1.

The image acquirer 120 may be a rotatable camera, and may be provided on the roof panel 113.

The vehicle 1 may further include a distance detector 130 for detecting the presence of an obstacle and a distance to the obstacle.

The distance detector 130 may be provided on the front panel 111 and the rear panel 114.

The distance detector 130 may include one or more Light Detection and Ranging (LiDAR) sensors.

The LiDAR sensor is a non-contact distance detection sensor using the laser radar principle.

The LiDAR sensor has a higher accuracy in lateral direction detections when compared to a radio detecting and ranging (RaDAR) sensor.

The distance detector 130 may include one or more radar sensors. The radar sensor is a sensor configured to detect the position and distance of an object using reflected waves generated by emission of radio waves when transmission and reception are performed in the same place.

The distance detector 130 may include one or more ultrasonic sensors.

The ultrasonic sensor generates ultrasonic waves for a predetermined time period, and detects a signal, which is reflected by an object and then returns.

The ultrasonic sensor may be used to determine the presence or absence of an obstacle, such as a pedestrian, in a short range.

The interior of the body includes a seat on which an occupant sits, a dashboard, a center fascia in which a vent and a control panel of an air conditioner are disposed, a head unit provided on the center fascia and configured to receive operation commands of the audio device, the resistive wire of the seat, and the air conditioner, and a cluster disposed on the dashboard and guiding travel functions and vehicle information, such as vehicle speed, engine revolutions per minute (RPM), fuel amount, coolant, and the like.

The chassis of the vehicle 1 is a frame that supports the body, and the chassis may include a power device, a braking device, and a steering device for applying a driving force, a braking force, and a steering force to wheels disposed at front left, front right, rear left and rear right wheels, and may further include a suspension device, a transmission device, and the like.

Figure 2:
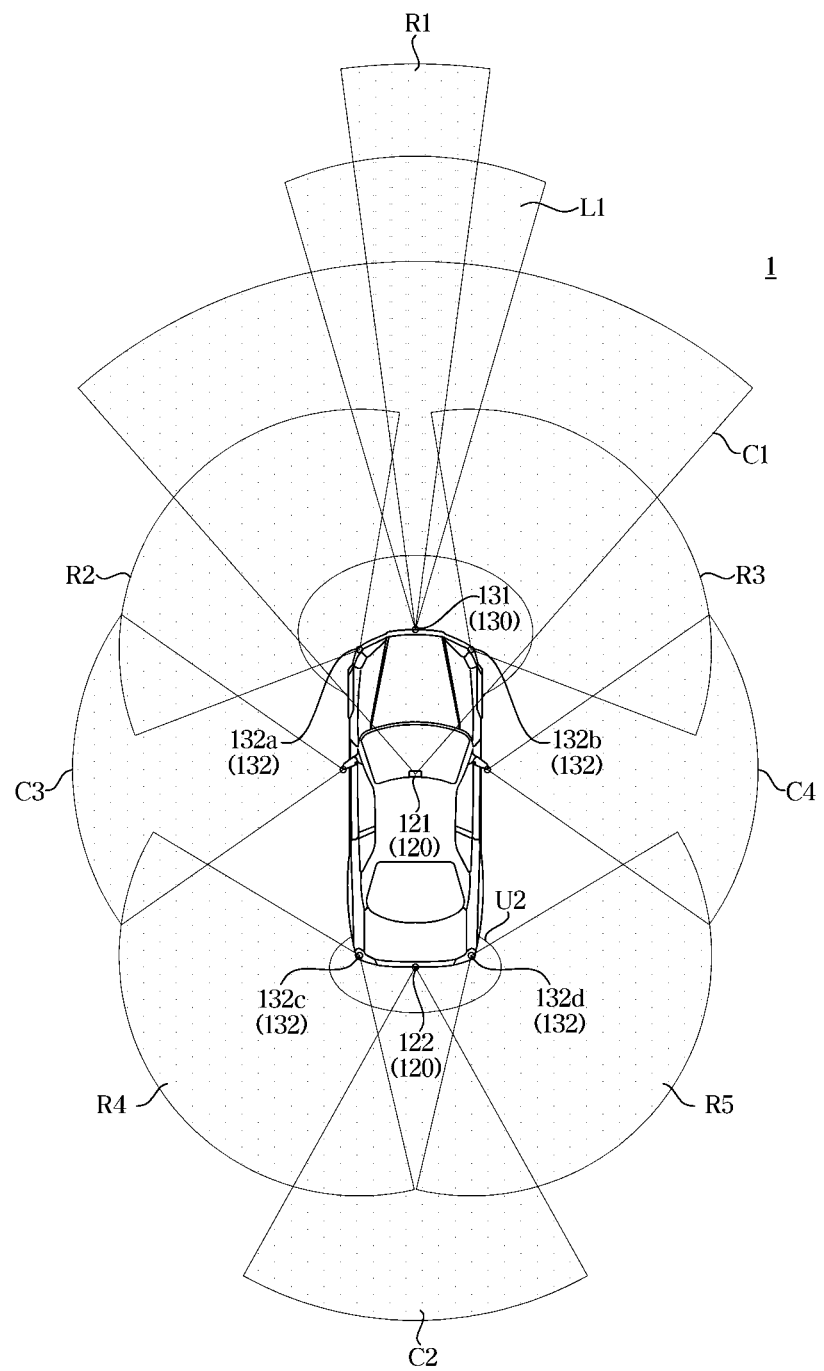
FIG. 2 is a diagram illustrating an example of recognition areas of an image acquirer and a distance detector of a vehicle according to an exemplary embodiment of the present disclosure.
Figure 3:
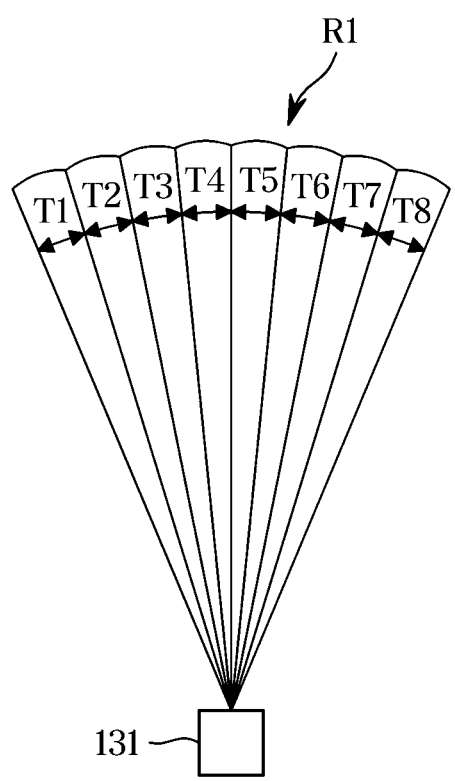
FIG. 3 is a diagram illustrating channels of a front radar sensor provided in a vehicle according to an exemplary embodiment of the present disclosure.

FIG. 2 is a diagram illustrating an example of recognition areas of an image acquirer and a distance detector of a vehicle according to an exemplary embodiment of the present disclosure, and FIG. 3 is a diagram illustrating channels of a front radar sensor provided in a vehicle according to an exemplary embodiment of the present disclosure.

The vehicle 1 includes the image acquirer 120 for securing fields of view respectively directed to the front, left and right sides, and rear of the vehicle 1, and the distance detector 130 for detecting obstacles on the front, left and right sides, and rear of the vehicle 1, and detecting the distances to the detected obstacles.

The first camera 121 of the image acquirer 120 may obtain an image within a recognition area C1 corresponding to a field of view directed to the front of the vehicle 1.

The second camera 122 of the image acquirer 120 may obtain an image within a recognition area $C_2$ corresponding to a field of view directed to the rear of the vehicle 1.

The third camera 123 of the image acquirer 120 may obtain an image within a recognition area C3 corresponding to a field of view directed to the left side of the vehicle 1, and the fourth camera 124 may obtain an image within a recognition area C4 corresponding to a field of view directed to the right side of the vehicle 1.

Each of the cameras of the image acquirer 120 may photograph the surroundings of the vehicle 1 and obtain image data of the surroundings of the vehicle 1. The image data of the surroundings of the vehicle 1 may include position information and shape information related to at least one of another vehicle, a pedestrian, a motorcycle (an auto bicycle), a cyclist, a lane line, a curb, a guard rail, a street tree and a street light located around the vehicle 1.

The distance detector 130 may include a front radar sensor 131 and a plurality of corner radar sensors 132.

The front radar sensor 131 has a field of sensing directed to the front of the vehicle 1 and detects an obstacle in a recognition area R1 corresponding to the field of sensing.

The plurality of corner radar sensors (132: 132*a*, 132*b*, 132*c*, and 132*d*) include a first corner radar sensor 132*a* provided on the front right side of the vehicle 1, a second corner radar sensor 132*b* provided on the front left side of the vehicle 1, a third corner radar sensor 132*c* provided on the rear right side of the vehicle 1, and a fourth corner radar sensor 132*d* provided on the rear left side of the vehicle 1.

The first corner radar sensor 132*a* may have a field of detecting directed to the front right side of the vehicle 1 and detect an obstacle in a recognition area R2 corresponding to the field of detecting.

The second corner radar sensor 132*b* may have a field of detecting directed to the front left side of the vehicle 1 and detect an obstacle in a recognition area R3 corresponding to the field of detecting.

The third corner radar sensor 132*c* may have a field of detecting directed to the rear right side of the vehicle 1 and detect an obstacle in a recognition area R4 corresponding to the field of detecting.

The fourth corner radar sensor 132*d* may have a field of detecting directed to the rear left side of the vehicle 1 and detect an obstacle in a recognition area R5 corresponding to the field of detecting.

Each of the front radar sensor 131 and the plurality of corner radar sensors 132 may include a transmission antenna (or a transmission antenna array) that radiates transmission radio waves to a corresponding one of the front, rear, and left/right sides of the vehicle 1 and a reception antenna (or a reception antenna array) that receives reflection radio waves reflected from an object.

Each radar sensor may obtain radar data in a corresponding one of front, rear, and left/right directions from the transmission radio waves transmitted by the transmission antenna and the reflection radio waves received by the reception antenna.

Each radar data in the front, rear, and left/right directions may include position information and velocity information regarding a bicycle, another vehicle, a pedestrian, or a cyclist located present in the corresponding direction of the vehicle 1.

Each of the radar sensors may determine the relative distance to the obstacle based on the phase difference (or time difference) between the transmission radio waves and the reflection radio waves, and determine the relative velocity of the obstacle based on the frequency difference between the transmission radio waves and the reflected radio waves.

Here, the front radar sensor may include a long-range radar sensor (LRR) that detects an obstacle in a recognition area of 80 to 200 m or more.

The corner radar sensor may include a short-range radar sensor (SRR) that detects an obstacle in a recognition area of 0.2 to 30 m or a medium-range radar sensor (MRR) that detects an obstacle in a recognition area of 30 to 80 m.

The distance detector 130 may further include a Light Detection and Ranging (LiDAR) sensor.

The LiDAR sensor has a field of detecting directed to the front of the vehicle 1 and detects an obstacle in a recognition area L1 corresponding to the field of detecting.

The LiDAR sensor is configured to detect information using a high-power pulse laser with strong straightness, and thus obtains more precise position information compared to radar.

The LiDAR sensor may detect an obstacle in a recognition area L1 of up to 200 m.

The LiDAR sensor may separately recognize distance information of the obstacle and shape information of the obstacle through accurate information related to the obstacle. That is, the LiDAR sensor may detect obstacle information as 3D information.

Each of the camera, the radar sensor, the LiDAR sensor, and the ultrasonic sensor may have a plurality of tracks facing different directions. That is, the recognition area of each of the camera, the radar sensor, the LiDAR sensor, and the ultrasonic sensor may be divided into a plurality of tracks.

For example, angles of a plurality of channels of a recognition area $C_1$ of the first camera may be the same as each other, and angles of a plurality of channels of a recognition area $C_2$ of the second camera may be the same as each other. In addition, the angles of the channels of the first camera and the channels of the second camera may be the same as or different from each other.

Referring to FIG. 3, the front radar sensor 131 may have a lateral angular resolution less than or equal to 5 degrees and detect the position of an obstacle present at a distance of 200 m or more through reception channels of eight tracks. Here, the lateral direction may be a direction perpendicular to the moving direction of the vehicle 1.

For example, a first channel T1 of the front radar sensor 131 may detect an obstacle present between 0 degrees and 5 degrees, and receive a detection signal through the first channel, a second channel T2 may detect an obstacle present between 5 and 10 degrees, and receive a detection signal through the second channel, and a third channel T3 may detect an obstacle between 10 and 15 degrees, and receive a detection signal through the third channel. Descriptions of the fourth to eighth channels will be omitted.

That is, the front radar sensor 131 transmits and receives signals through eight channels, in which signals are sequentially transmitted and received based on a preset order, and based on the received signals, an object present in a detection direction corresponding to each of the channels and the direction and distance of the obstacle are detected based on the signal received through each channel.

Figure 4:
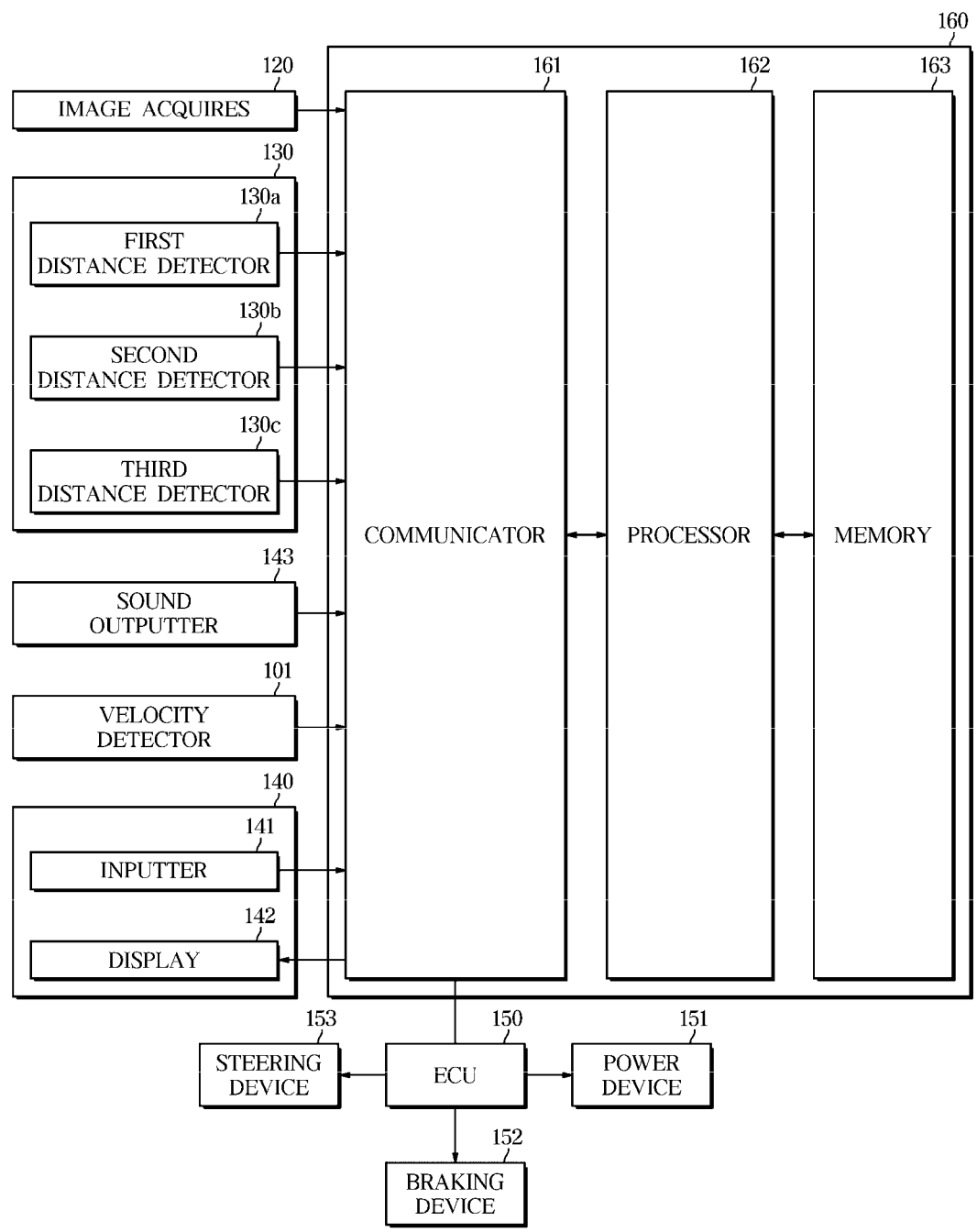
FIG. 4 is a control block diagram illustrating a vehicle according to an exemplary embodiment of the present disclosure.

FIG. 4 is a control block diagram illustrating a vehicle according to an exemplary embodiment of the present disclosure.

The vehicle 1 includes a velocity detector 101, an image acquirer 120, a distance detector 130, a user interface 140, a sound outputter 143, an electronic control unit (ECU, 150), a power device 151, a braking device 152, a steering device 153, and an advanced driver assistance system (ADAS) 160.

The velocity detector 101 detects the traveling velocity of the vehicle 1 and transmits velocity information related to the detected traveling velocity to the processor 162.

The velocity detector 101 includes a plurality of wheel velocity sensors that output detection information (i.e., wheel velocity information) corresponding to the rotational velocities of the wheels provided on front, rear, left and right wheels of the vehicle 1.

The velocity detector 101 may include an acceleration sensor that outputs detection information (i.e., acceleration information) corresponding to the acceleration of the vehicle 1.

The velocity detector 101 may include both the plurality of wheel velocity sensors and the acceleration sensor.

The image acquirer 120 may include one or two or more cameras.

The image acquirer 120 is implemented to detect information related to an object of surroundings of the vehicle 1 and converts the information into an electrical image signal, and may detect object information on the front, left and right sides of the host vehicle, and transmit an image signal of the detected object information to the processor 162.

The distance detector 130 may include a first distance detector 130a including one or more radar sensors.

The distance detector 130 may further include a second distance detector 130b including one or more LiDAR sensors.

The distance detector 130 may further include a third distance detector 130c including one or more ultrasonic sensors.

The image acquirer 120, the first distance detector 130a, the second distance detector 130b, and the third distance detector 130c have already been described with reference to FIG. 2, and thus details thereof will be omitted from description of control configuration of the vehicle 1.

The user interface 140 may receive a user input and display an image corresponding to the user input.

The user interface 140 displays information related to at least one of an audio mode, a video mode, a navigation mode, a digital audio broadcasting (DMB) mode, and a radio mode.

The user interface 150 may display autonomous driving control information in an autonomous driving mode and may also display images of the surrounding of the vehicle 1 in an autonomous driving mode.

The user interface 140 may, in a map display mode, display a map image within a certain range from the current location of the vehicle 1, and in a navigation mode, display map information, to which route information from the current location to the destination is matched, and road guidance information.

The user interface 140 may display an image obtained by at least one camera among the cameras of the image acquirer 120.

The user interface 140 may include a display 142, and may further include an inputter 141.

When the user interface 140 includes both the inputter 142 and the display 141, the user interface 140 may be provided as a touch screen in which the inputter 141 and the display 142 are integrally formed with each other.

When the user interface 140 includes only the display, the inputter may be provided on the head unit or center fascia of the vehicle 1, and may be provided as at least one of a button, a switch, a key, a touch panel, a jog dial, a pedal, a keyboard, a mouse, a track ball, various levers, a handle, or a stick.

The inputter 141 of the user interface 140 receives an operation command of a navigation mode, and receives destination information related to a destination when the navigation mode is performed.

The inputter 141 may receive selection information related to one of a plurality of routes found from the current location to the destination.

The inputter 141 receives one of a manual driving mode in which the driver directly drives the vehicle 1 or an autonomous driving mode in which the vehicle 1 autonomously travels, and transmits the input signal to the processor 162.

The inputter 141 may, in the autonomous travelling mode, receive destination information and may also receive a target travelling velocity.

The inputter 141 may also receive an ON/OFF command of a collision warning mode.

The display 142 displays information related to a function being performed in the vehicle 1 and information input by the user.

The display 142 displays the travelling mode of the vehicle 1.

The display 142 displays a route to a destination and a map, to which the route is matched, when the navigation mode is performed.

The display 142 may, in an autonomous travelling mode, display an image of the surroundings, and may display the relative position of an obstacle together with an emoticon of the vehicle 1.

The display 142 displays notification information related to the collision warning mode.

The vehicle 1 may further include a cluster for displaying the notification information related to the collision warning mode.

The sound outputter 143 may output a sound for a function being performed in the vehicle 1.

The sound outputter 143 may output a sound in response to a control command of the processor 162, and may output the sound with a sound type and volume size corresponding to the control command of the processor 162.

The sound outputter 143 outputs notification information related to the collision warning mode.

For example, the sound outputter 143 may output notification information related to an obstacle present in front of the vehicle 1 as a sound when the vehicle is in a travelling state. The sound outputter 123 may output warning information regarding the possibility of collision with an obstacle as a sound when the vehicle is in a travelling state.

The sound outputter 143 may include one or more speakers, and may include a Klaxon.

The vehicle 1 includes a driving device and an electronic control unit (ECU) 150 that is configured to control driving of various safety devices and various detection devices.

Here, the ECU 150 may be provided in a plurality of units thereof for the respective electronic devices, or may be provided as a single unit to control the plurality of electronic devices integrally.

The power device 151 may be a device that generates a driving force for the vehicle. In the case of an internal combustion engine vehicle, the power device 151 may include an engine and an engine control unit. In the case of an eco-friendly vehicle, the power device may include a motor, a battery and a motor control unit, and a battery management device.

In the case of an internal combustion engine vehicle, the power device may control the engine in response to the driver's intention to accelerate via an accelerator pedal. For example, the engine control unit may control the torque of the engine.

The braking device 152 may be a device that generates a braking force in the vehicle 1.

The braking device 152 may decelerate the vehicle 1 or stop the vehicle 1 through friction with the wheels.

The braking device 152 may include an electronic brake control unit. The electronic brake control unit may, in response to a braking intention of the driver through a braking pedal and/or a slip of the wheels, control the braking force. For example, the electronic brake control unit may temporarily deactivate the braking of the wheels in response to a slip of the wheels detected at a time of braking of the vehicle 1 (anti-lock braking systems: ABS).

The electronic brake control unit may selectively deactivate braking of the wheels in response to over-steering and/or under-steering detected at a time of steering of the vehicle 1 (electronic stability control: ESC)

Furthermore, the electronic brake control unit may temporarily brake the wheels in response to a slip of the wheels detected at a time of driving of the vehicle 1 (traction control system: TCS).

The braking device 152 may also perform braking or deceleration in response to a control command of the processor 162.

The steering device 152 may be a device configured for changing the heading direction of the vehicle 1.

The steering device 153 may change the heading direction in response to a steering intention of a driver through the steering wheel. The steering device 153 may include an electronic steering control unit, and the electronic steering control unit may decrease the steering force when travelling at a low velocity or parking, and increase the steering force when travelling at a high velocity.

The steering device 153 may change the heading direction in response to a control command of the processor 162.

The ADAS 160 may perform an autonomous driving mode that enables autonomous driving from the current position to the destination based on current position information of the vehicle 1, map information, and destination information, and may perform an autonomous parking mode that enables autonomous parking upon arrival at the destination or temporarily parking.

The ADAS 160 may determine the possibility of collision with a nearby obstacle and output warning information corresponding to the possibility of collision.

The ADAS 160 may include a communicator 161, a processor 162, and a memory 163. Here, the processor 162 may be a processor provided in the vehicle.

The communicator 161 also performs communication between devices inside the vehicle.

The communicator 161 may perform controller area network (CAN) communication, universal serial bus (USB) communication, Wi-Fi communication, and Bluetooth communication, and may further perform a broadcasting communication module, such as Transport Protocol Expert Group (TPEG), Sign-extension mode (SXM), or radio data system (RDS) of DMB, and 2G, 3G, 4G and 5G communication.

The communicator 161 may include one or more components that enable communication with an external device, and may include, for example, at least one of a short-range communication module, a wired communication module, and a wireless communication module. Here, the external device may be a terminal or a server.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wireless communication module may include wireless communication modules supporting various wireless communication methods, such as a WiFi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division a plurality of access (TDMA) module, a long term evolution (LTE) module, and the like.

The communicator 161 includes a Global Positioning System (GPS) receiver (or a location receiver) that communicates with a plurality of satellites and recognizes a current location based on information provided from the plurality of satellites.

That is, the location receiver recognizes the current location of the vehicle 1 by receiving signals sent by artificial satellites, and transmits current position information on the recognized current location to the processor 162.

The processor 162 may, based on a manual driving mode being input, control travelling based on manipulation information such as a brake pedal, an accelerator pedal, a shift lever, and a steering wheel.

The processor 162 may, based on a navigation mode being selected, identify the current position information received by the location receiver and control the display 142 to display a map within a predetermined range of the current location based on the identified current position information.

The processor 162 may, based on destination information being input after the navigation mode is selected, search for a route from the current position to the destination based on the input destination information and the current position information received by the location receiver, and control the display 142 to display a map to which the found route is matched.

The processor 162 identifies the current location during travel in real time, and allows the identified current location to be displayed on the map on the display in real time while allowing route guidance information to be output through the display 142 and the sound outputter 143.

The processor 162 may, in response to an on-command of an autonomous driving mode, allow the vehicle 1 to recognize a road environment of the vehicle itself, determine a travelling situation, and control travel of the vehicle 1 according to a planned route to thereby autonomously control of the vehicle 1 to the destination.

The processor 162 may, in response to image information of a road being received from the image acquirer 120 during the autonomous driving mode, perform image processing to recognize lane lines of the road, recognize a lane, in which the host vehicle 1 is travelling, based on the recognized position information of the recognized lane lines, generate a tracking line based on information related to the recognized lane, generate a travelling route based on the position of the generated tracking line, and control autonomous driving according to the generated travelling route.

The tracking line is a line for allowing the center portion of the body of the vehicle 1 to follow one position on the lane. Here, the one position on the lane may represent the position of one of two lane lines forming the lane, or the position in the middle between the two lane lines.

The processor 162 is configured to control acceleration and deceleration of the vehicle 1 for the vehicle 1 to travel at a preset target travelling velocity or a travelling velocity input by a user during an autonomous travelling mode.

The processor 162 may obtain the travelling velocity of the vehicle 1 based on detection information output from the plurality of wheel speed sensors.

The processor 162 may obtain the travelling velocity of the vehicle 1 based on detection information output from the acceleration sensor.

The processor 162 may obtain the travelling velocity of the vehicle 1 based on detection information output from the plurality of wheel speed sensors and detection information output from the acceleration sensor.

The processor 162 may also obtain the travelling velocity based on change information of the current position information provided from the location receiver.

The processor 162 may recognize at least one of the position of the obstacle and the moving velocity of the obstacle based on the image information of the image acquirer 120, the obstacle information of the first, second, and third distance detectors 130*a*, 130*b*, and 130*c*, and the traveling velocity information of the velocity detector 101, and control the travelling velocity or avoidance traveling based on the recognized position of the obstacle and the recognized moving speed of the obstacle.

The position of the obstacle may include a relative direction of the obstacle with respect to the host vehicle 1 and the relative distance to the obstacle. Obstacles may include bikes, street trees, traffic lights, crosswalks, pedestrians, cyclists, median strips, road signs, personal mobility, safety cones, and the like.

The processor 162 may determine a time to collision (TTC) between the vehicle 1 and front obstacles based on the position information (relative distance) and the velocity information (relative velocity) of the front objects, and based on a result of comparing the TTC with a predetermined reference time, warn the driver of a collision, transmit a braking signal to the braking device 152, or transmit a steering signal to the steering device 153.

The processor 162 may determine a distance to collision (DTC) based on the velocity information (relative velocity) of front objects, and based on a result of comparing the DTC with distances to the front objects, warn the driver of a collision or transmit a braking signal to the braking device 152.

The processor 162 may, upon determining that there is a possibility of collision with an obstacle during travel, control output of warning information regarding the possibility of collision, and may control the sound outputter 143 to output a sound.

The processor 162 may, during an autonomous driving mode, process front image information of the camera 121, front radar data of the front radar 131, and corner radar data of the plurality of corner radars 132 and may generate a baking signal and a steering signal for controlling the braking device 152 and the steering device 153 and may generate a power signal for controlling the power device 151.

For example, the processor 162 may recognize obstacles in front of the vehicle 1 based on the front image data of the first camera 121 and the front radar data of the front radar 131, and may obtain position information (direction) and type information (e.g., whether the obstacle is another vehicle, a pedestrian, a cyclist, a cub, a guard rail, a roadside tree, a street lamp, or the like) of the recognized obstacles.

The processor 162 may match the obstacles detected by the front image data with the obstacles detected by the front radar data, obtain the type information, the position information, and the velocity information of the obstacles in front of the vehicle 1 based on a result of the matching, and generate a braking signal and a steering signal based on the type information, the position information, and the velocity information of the front obstacles.

The processor 162 may perform sensor fusion on data of at least one camera, at least one radar sensor, at least one LiDAR sensor, and at least one ultrasonic sensor.

Sensor fusion is a process of combining inputs of several different devices, such as radar sensors, LiDAR sensors, ultrasonic sensors, and cameras, to form a single model or image of a surrounding environment of the vehicle.

As shown in FIG. 2, the recognition area of the radar sensor, the recognition area of the LiDAR sensor, the recognition area of the ultrasonic sensor, and the recognition area of the camera may partially overlap each other. Accordingly, a same obstacle may be detected through at least two of the radar sensor, the LiDAR sensor, the ultrasonic sensor, and the camera.

Accordingly, the processor 162 may allow a same obstacle among obstacles detected in at least two recognition areas to be recognized through sensor fusion. This is referred to as a fusion track. Here, the at least two recognition areas may represent recognition areas including an overlapping recognition area therebetween.

The processor 162 may determine whether the number of fusion tracks and the number of single tracks are the same, and upon determining that the number of fusion tracks and the number of single tracks are the same, control the travelling velocity or avoidance travelling based on the location information and velocity information of the obstacle detected by the distance detector. Here, the single track may be a track recognized by the first camera or a track recognized by each distance detector.

The processor 162 may determine whether two or more obstacles are obstacles traveling in a cluster-traveling on the same route, and upon determining that the two or more obstacles in a cluster traveling on the same route, control at least one of braking and steering based on position information of the obstacles in a cluster travelling.

The processor 162 determines whether the number of fusion tracks and the number of single tracks are the same, and upon determining that the number of fusion tracks and the number of single tracks are different, recognizes an obstacle based on presence/absence of a fusion track, movement information of the fusion track, and movement information of the single track, determines a risk of collision with the recognized obstacle, and is configured to control collision avoidance in response to the determined risk of collision.

The processor 162 may, based on the presence/absence of the fusion track, movement information of the fusion track, and movement information of the single track, obtains a gate size and recognizes a clustering obstacle based on the obtained gate size, obtains a cluster area for the recognized clustering obstacle, determines the validity of the obtained cluster area, determine a risk of collision with the vehicle, and control collision avoidance in response to the determined validity of the cluster area and the risk of collision.

Here, the fusion track and the single track may represent obstacles forming a cluster.

Determining of the validity of the cluster area is determining whether the cluster area is an area formed by the obstacles forming a cluster.

Such a configuration enables fusion tracks to be generated for all of the plurality of obstacles, improving the control accuracy for collision prevention and collision avoidance.

By obtaining a cluster area that reflects dynamic characteristics of a vehicle and obstacles, obstacles may be recognized in response to various cluster travelling situations.

This will be described in more detail with reference to FIG. 5, FIG. 6, FIG. 7, FIG. 8, FIG. 9, FIG. 10 and FIG. 11.

Figure 5:
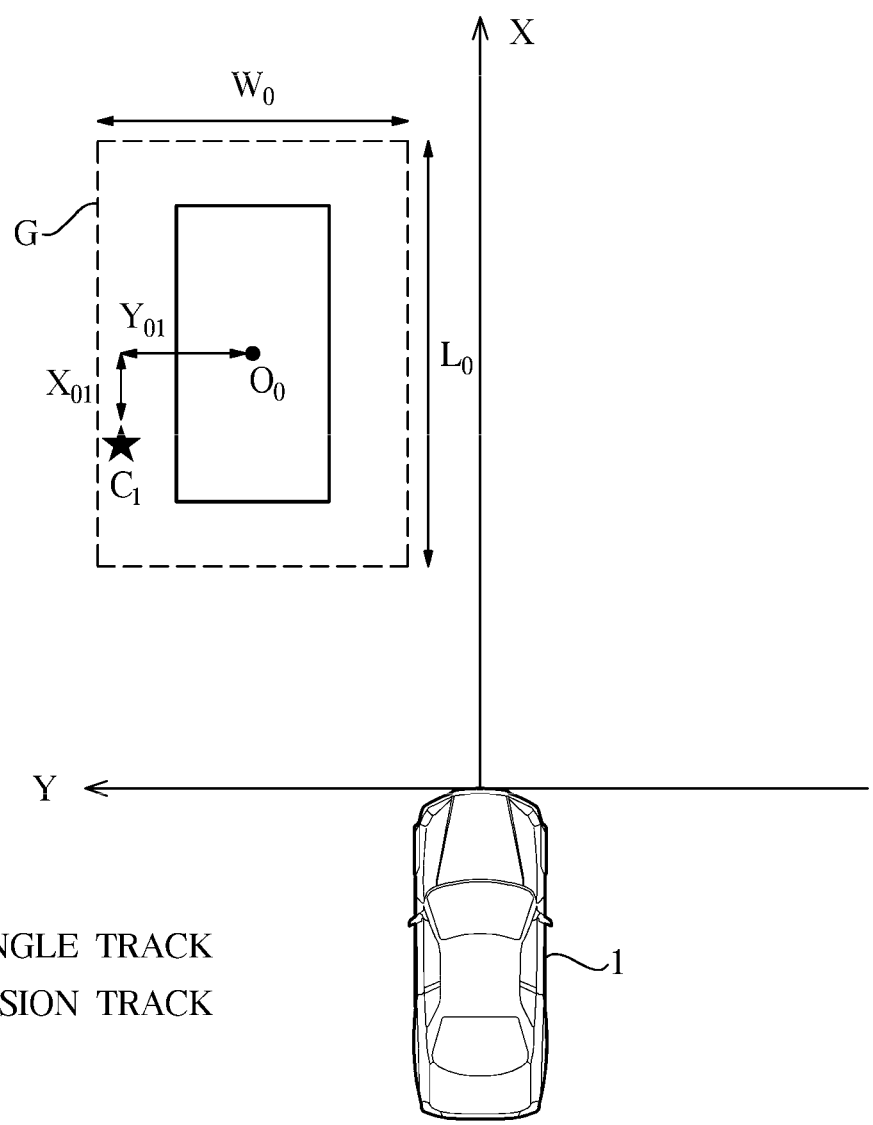
FIG. 5 and FIG. 6 are diagrams illustrating generation of a gate area when there is a fusion track among tracks recognized through a vehicle according to an exemplary embodiment of the present disclosure.
Figure 6:
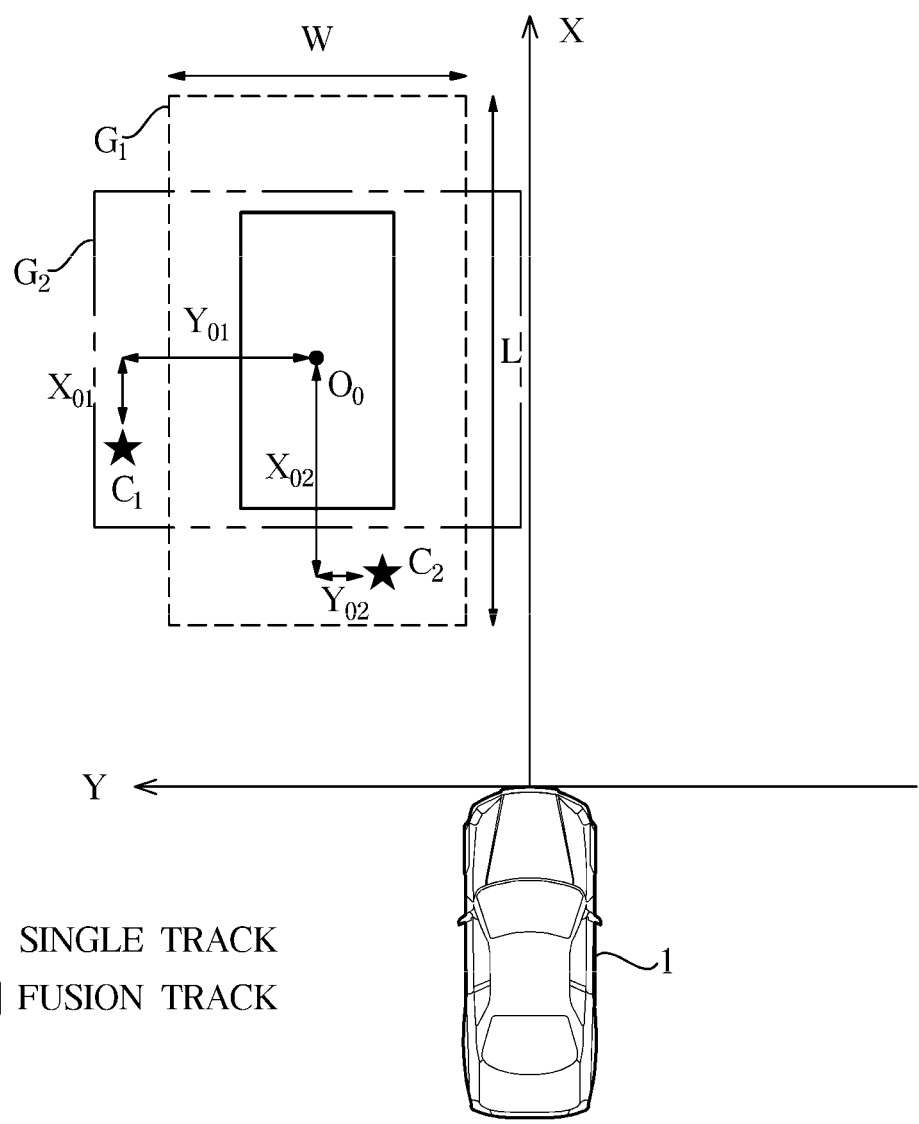
Figure 7:
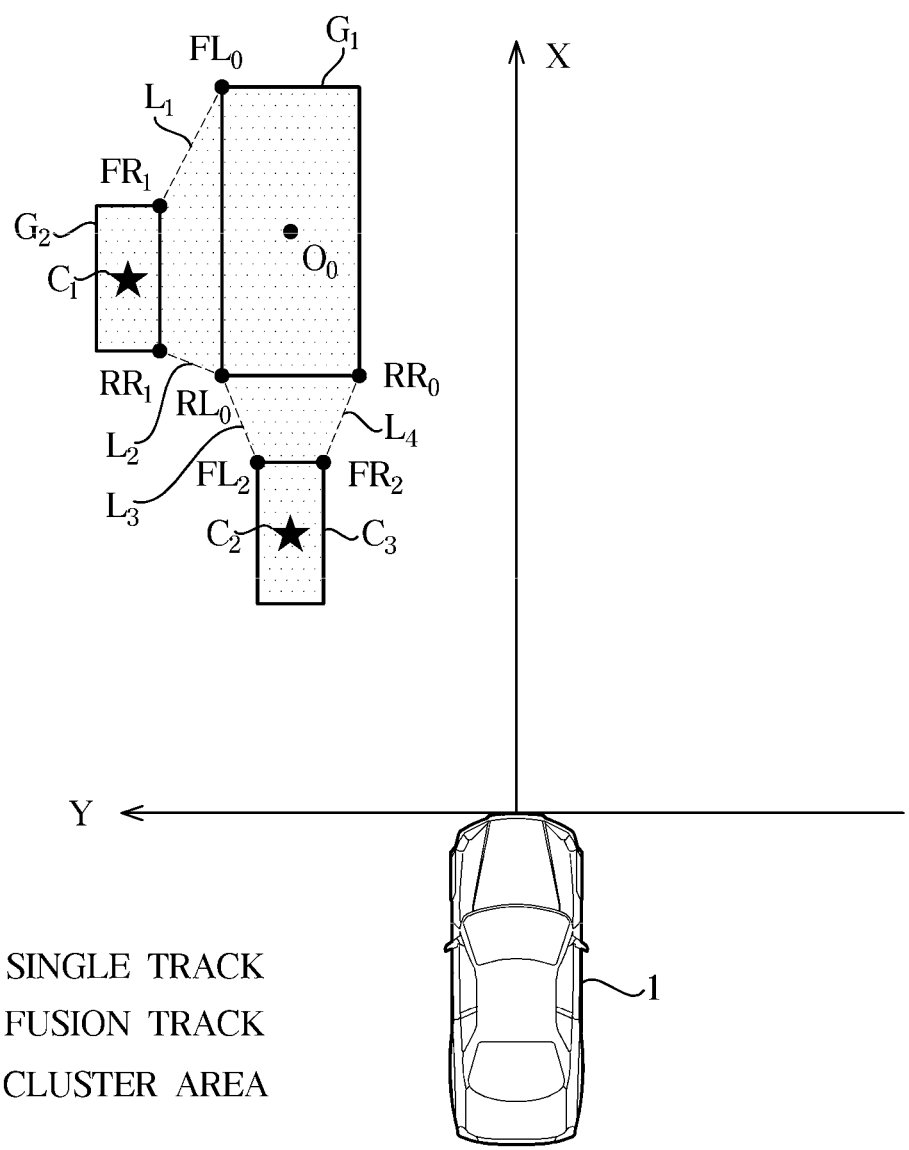
FIG. 7 is a diagram illustrating an example of obtaining a cluster area when there is a fusion track among tracks recognized through a vehicle according to an exemplary embodiment of the present disclosure.

FIG. 5 and FIG. 6 are diagrams illustrating generation of a gate area when there is a fusion track among tracks recognized through a vehicle according to an exemplary embodiment of the present disclosure. FIG. 7 is a diagram illustrating an example of obtaining a cluster area when there is a fusion track among tracks recognized through a vehicle according to an exemplary embodiment of the present disclosure.

Figure 8:
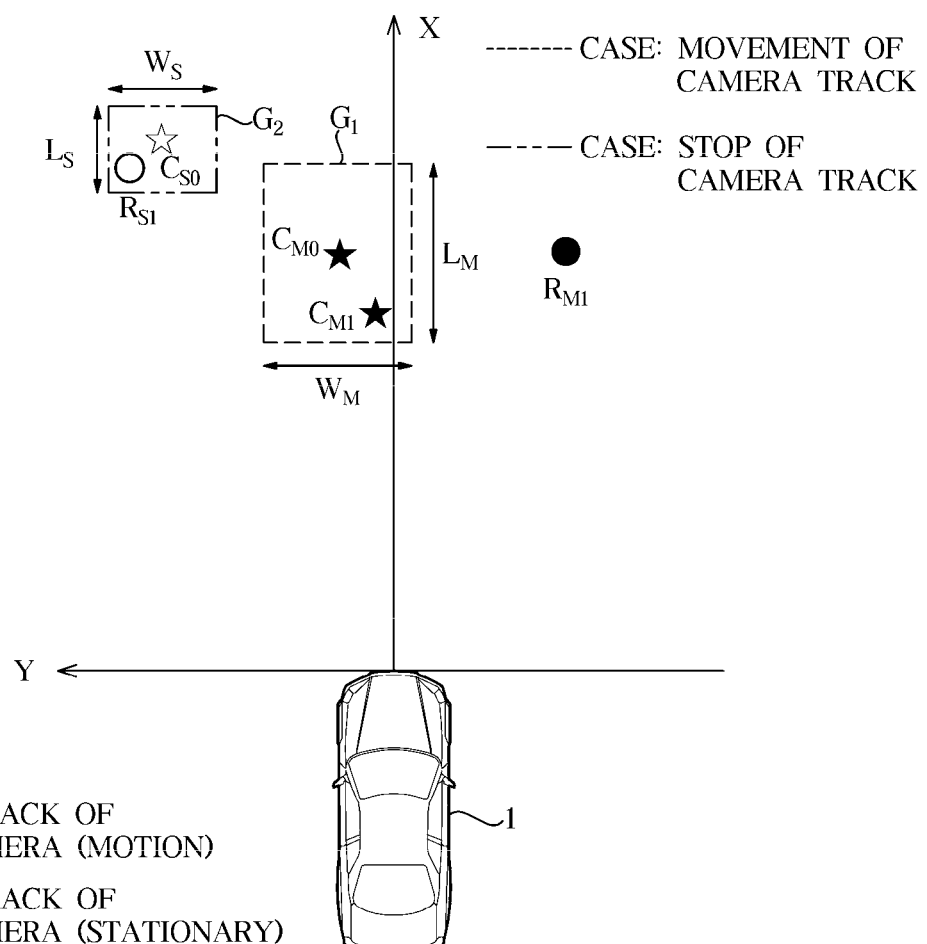
FIG. 8 is a diagram illustrating generation of a gate area when there is no fusion track among tracks recognized through a vehicle according to an exemplary embodiment of the present disclosure.
Figure 9:
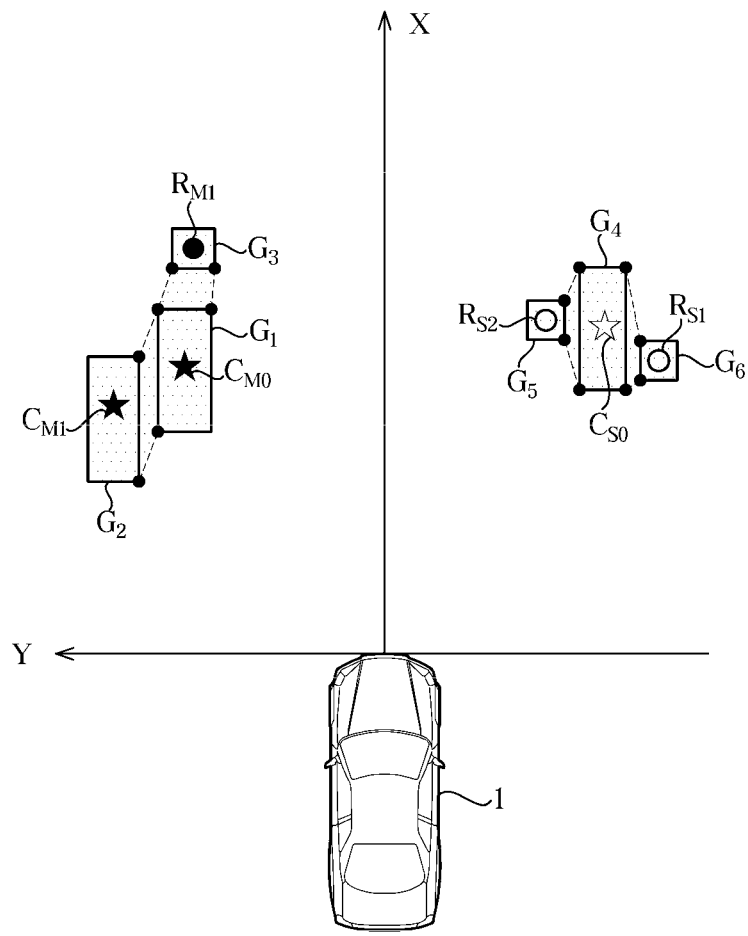
FIG. 9 is a diagram illustrating an example of obtaining a cluster area when there is no fusion track among tracks recognized through a vehicle according to an exemplary embodiment of the present disclosure.

FIG. 8 is a diagram illustrating generation of a gate area when there is no fusion track among tracks recognized through a vehicle according to an exemplary embodiment of the present disclosure, and FIG. 9 is a diagram illustrating an example of obtaining a cluster area when there is no fusion track among tracks recognized through a vehicle according to an exemplary embodiment of the present disclosure.

Figure 10A:
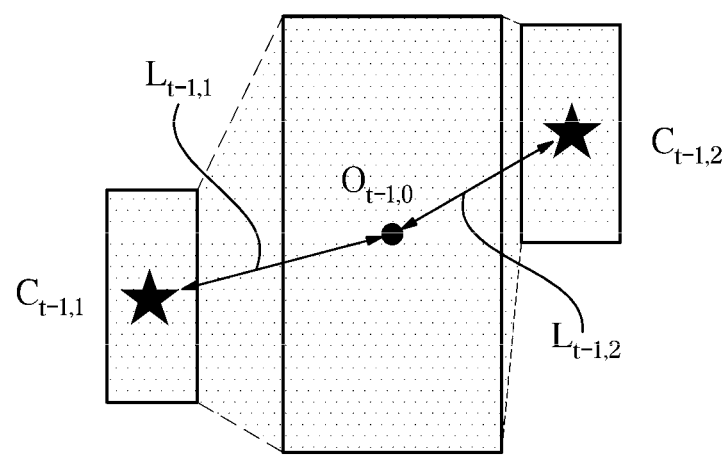
FIG. 10A, FIG. 10B, and FIG. 10C are diagrams illustrating an example of validity determination of tracks recognized through a vehicle according to an exemplary embodiment of the present disclosure.
Figure 10B:
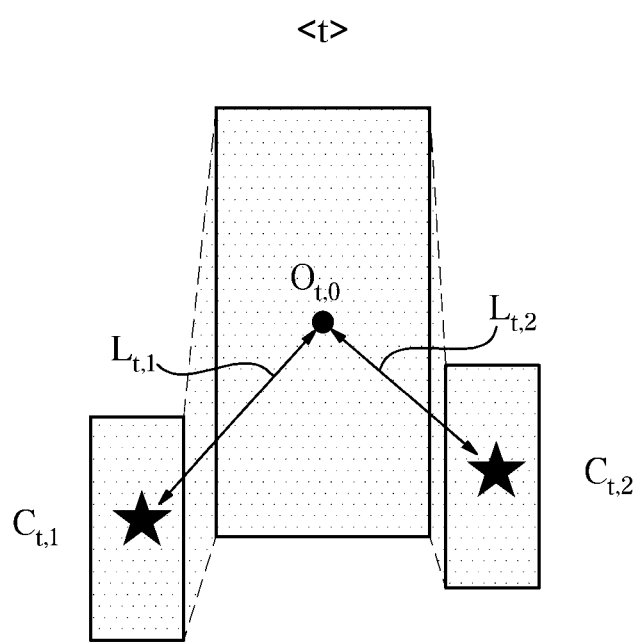
Figure 10C:
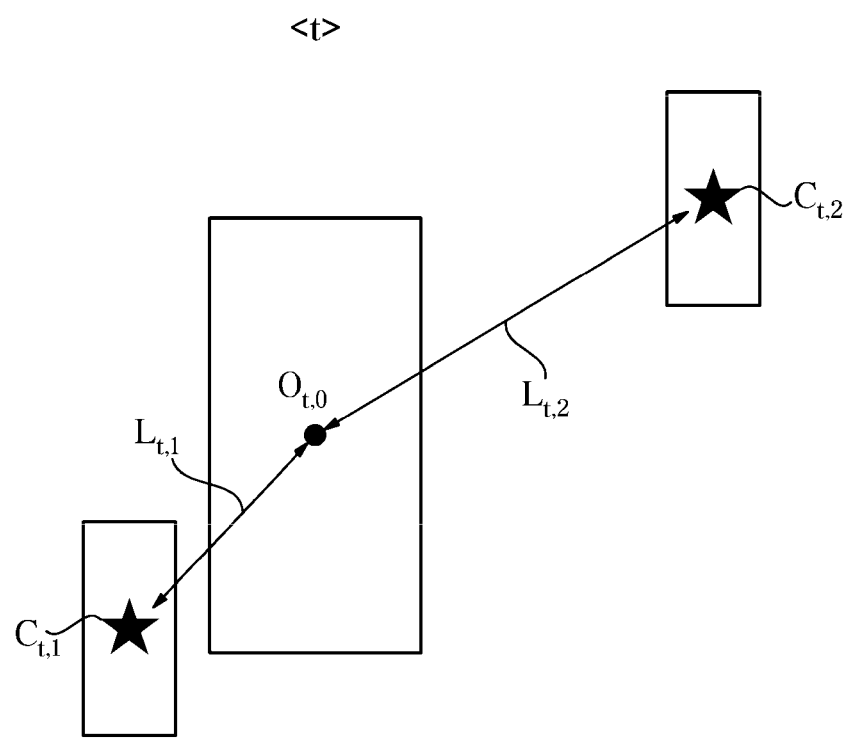
Figure 11:
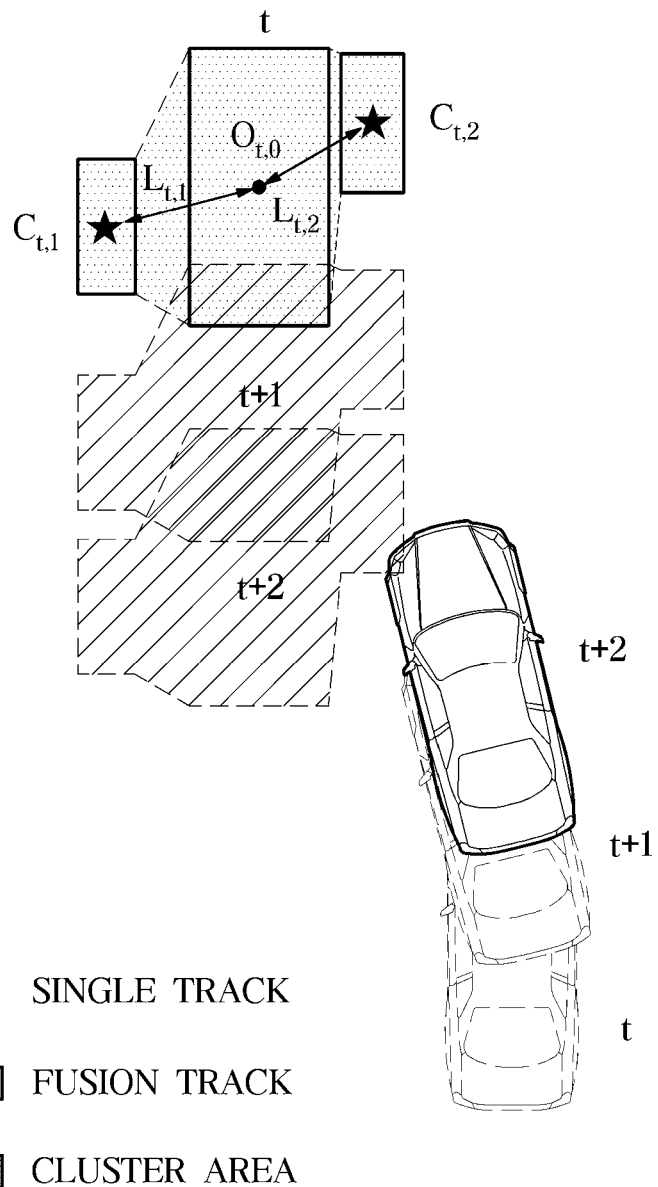
FIG. 11 is a diagram illustrating an example of determination of a collision with a cluster area obtained through a vehicle according to an exemplary embodiment of the present disclosure.

FIG. 10A, FIG. 10B, and FIG. 10C are diagrams illustrating an example of validity determination of tracks recognized through a vehicle according to an exemplary embodiment of the present disclosure, and FIG. 11 is a diagram illustrating an example of determination of a collision with a cluster area obtained through a vehicle according to an exemplary embodiment of the present disclosure.

First, the following description will be made with reference to FIG. 5.

The processor 162, based on an obstacle being detected by the image acquirer 120 and the distance detector 130, determines whether there is a fusion track, and upon determining that there is a fusion track, obtains movement information of the fusion track and determines whether the fusion track is in a stationary state or in a moving state based on the obtained movement information of the fusion track.

Herein, the obtained movement information of the fusion track may include longitudinal velocity information and lateral velocity information of the fusion track.

The processor 162, upon determining that the fusion track is in the stationary state, identifies reference position information $O_0$ of the fusion track and first reference gate size information $W0$, $L_0$, and generates a gate area G based on the reference position information $O_0$ of the fusion track and the first reference gate size.

The first reference gate size information is preset information, and may include gate size information $L_0$ in a first direction and gate size information $W_0$ in a second direction thereof.

Here, the first direction may be a longitudinal direction, and the second direction may be a lateral direction thereof.

The processor 162 identifies one or more single tracks present in the generated gate area, recognizes a single track in a stationary state among the identified one or more single tracks, and obtains position information $C_1$ of the recognized single track.

The processor 162 may obtain the relative velocity information of each of the single tracks based on the travelling velocity information of the vehicle and the moving velocity information of the single tracks, and recognize the single track in a stationary state based on the obtained relative velocity information of each of the single tracks.

For example, the processor 162 may recognize a single track $C_n$ present within a distance of $0.5 \times L_0$ or less in the first direction (i.e., the longitudinal) from the reference position $O_0$ of the fusion track and $0.5 \times W_0$ or less in the second direction (i.e., the lateral direction) from the reference position $O_0$ of the fusion track.

The recognized single track $C_n$ is a track that moves on the same route as the fusion track in a stationary state, and may be a single track forming a cluster with the fusion track in a stationary state.

$$Y_{On} \le 0.5 \times L_0, \ X_{On} \le 0.5 \times W_0$$

$C_n$: the $n^{th}$ single track $X_{On}$: the relative longitudinal position from the reference position of the fusion track to the $n^{th}$ single track $Y_{On}$: the relative lateral position from the reference position of the fusion track to the $n^{th}$ single track Next, the following description will be made with reference to FIG. 6.

The processor 162, upon determining that there is a fusion track in a moving state, identifies movement information and reference position information of the fusion track in a moving state, obtains gate size information corresponding to the movement information of the fusion track, and generates a gate area based on the obtained gate size information and the reference position information.

The processor 162 may, when generating the gate area, obtain movement information in the first direction among the movement information of the fusion track in a moving state, obtain first gate size information corresponding to the movement information in the first direction, and generate a first gate area $G_1$ based on the obtained first gate size information and the reference position information, and also may obtain movement information in the second direction among the movement information of the fusion track in a moving state, obtain second gate size information corresponding to the movement information in the second direction, and generate a second gate area $G_2$ based on the second gate size information and the reference position information.

Here, the first gate size information corresponding to the movement information in the first direction and the second gate size information corresponding to the movement information in the second direction are determined by the ratio of the velocity in the first direction to the velocity in the second direction thereof.

$$\text{Index } K = |\text{LongVel0}/\text{LatVel0}|$$

LongVel0: the longitudinal velocity of the fusion track
LatVel0: the lateral velocity of the fusion track The first gate area is an area for when the longitudinal velocity characteristic of the fusion track is great, and the second gate area is an area for when the lateral velocity characteristic of the fusion track is great.

The processor 162 identifies one or more single tracks present in the first gate area $G_1$ and recognizes a single track in a moving state among the identified one or more single tracks.

The processor 162 identifies one or more single tracks present in the second gate area $G_2$ and recognizes a single track in a moving state among the identified one or more single tracks.

For example, the processor 162 may recognize a single track $C_n$ present within a distance of 0.5×L or less in the first direction (i.e., the longitudinal) from the reference position $O_0$ of the fusion track and 0.5×W or less in the second direction (i.e., the lateral direction) from the reference position $O_0$ of the fusion track.

$$Y_{On} \leq 0.5 \times L,\ X_{On} \leq 0.5 \times W$$

$$L = \min(L0 + Ka1, b1L0),\ W = \min(W0 + Ka2, b2W0)$$

a1, a2, b1, b2: tuning parameters
$C_n$: the $n^{th}$ single track
$X_{On}$: the relative longitudinal position from the reference position of the fusion track to the $n^{th}$ single track
$Y_{On}$: the relative lateral position from the reference position of the fusion track to the $n^{th}$ single track The processor 162 identifies the movement velocity information of each of the identified one or more single tracks, and based on the moving velocity information of each of the single tracks and the moving velocity information of the fusion track in a moving state, recognizes at least one single track, of which the velocity difference with the fusion track is less than or equal to a reference velocity difference, and obtains position information of the recognized at least one single track.

Here, the recognized at least one single track is a track that moves along the same route as the fusion track in a moving state, and may be a single track forming a cluster with the fusion track in a moving state.

The processor may, upon determining that the fusion track is in a moving state, compare the moving velocity information (i.e., the velocity in the first direction) of single tracks in a moving state located within the first gate area with the velocity in the first direction of the fusion track, and recognize a first single track of which the velocity difference with the fusion track is less than or equal to a first reference velocity.

The processor may, upon determining that the fusion track is in a moving state, compare the moving velocity information (i.e., the velocity in the second direction) of the single tracks in a moving state located within the second gate area with the velocity in the second direction of the fusion track, and recognize a second single track of which the velocity difference with the fusion track is less than or equal to a second reference velocity.

|LongVel0−LongVeln|<=the first reference velocity

|LatVel0−LatVeln|<=the second reference velocity

LongVeln: the longitudinal velocity of the $n^{th}$ single track
LatVeln: the lateral velocity of the $n^{th}$ single track For example, the processor 162 may obtain position information $X_{O2}$, $Y_{O2}$ of a single track $C_2$ in a moving state located in the first gate area $G_1$, and position information $X_{O1}$, $Y_{O1}$ of a single track $C_1$ in a moving state located in the second gate area $G_2$.

The processor 162 generates a gate area of the fusion track and a gate area of at least one single track, identifies position information of each of the corners of the gate areas, obtain position information of corners of two neighbor gate areas from the position information of the corners of the gate areas, and based on the position information of the corners of the two neighbor gate areas, generate lines connecting the corners of the two neighbor gate areas.

Here, corners of two neighbor gate areas among corners of different gate areas may represent corners at both end portions of one edge portion among edge portions of the different gate areas and the other edge portion opposite to the one edge portion.

The processor 162 may identify the gate area of the fusion track and the gate area of the single track adjacent to the gate area of the fusion track, and generate lines that connect corners of the gate area of the fusion track and corners of the gate area of the single track adjacent to the corners of the gate area of the fusion track.

The processor 162 may obtain the gate area of the fusion track and the gate area of the single track as one cluster area using the lines.

Referring to FIG. 7, when a first gate area $G_1$, a second gate area $G_2$, and a third gate area $G_3$ are present, the processor 162 generates a first line L1 connecting a first corner $FL_0$ of a first gate area $G_1$ to a first corner $FR_1$ of a second gate area $G_2$, and generates a second line $L_2$ connecting a second corner $RL_0$ of the first gate area $G_1$ to a second corner $RR_1$ of the second gate area $G_2$.

Furthermore, the processor 162 generates a third line $L_3$ connecting the second corner $RL_0$ of the first gate area $G_1$ to a first corner $FL_2$ of a third gate area $G_3$, and generate a fourth line $L_4$ connecting a third corner $RR_0$ of the first gate area $G_1$ to a second corner $FR_2$ of the third gate area $G_3$.

The processor 162 may use the first, second, third, and fourth lines as boundaries between the plurality of gate areas to obtain the gate area of the fusion track and the gate areas of the first and second single tracks as one cluster area.

The processor 162 may, when the position of a front right corner ($FR_0$, the first corner) of the second gate area $G_2$ of the first single track is farther from the center portion of the body of the vehicle 1 than the position of a front left corner ($FL_0$, the first corner) of the first gate area $G_1$ of the fusion track is, generate a first line $L_1$ and a second line $L_2$ outside of the front left corner ($FL_0$, the first corner) of the first gate area $G_1$ of the fusion track.

The processor 162 may generate, when the position of a front right corner ($FR_2$, the second corner) of the third gate area $G_3$ of the second single track is same as the center portion of the body of the vehicle 1 or closer to the center portion of the body of the vehicle 1 than the position of a front left corner ($FL_0$, the first corner) of the first gate area $G_1$ of the fusion track is, generate a third line $L_3$ and a fourth line $L_4$ inside of the front left corner ($FL_0$, the first corner) of the first gate area $G_1$ of the fusion track.

The processor 162 may obtain area information related to the cluster area. This will be referred to as an example below.

$$L_1:\ y = (Y_{FL0} - Y_{FR1}/X_{FL0} - X_{FR1}) \times (x - X_{FL0}) + Y_{FL0}$$

$$L_2:\ y = (Y_{RL0} - Y_{RR1}/X_{RL0} - X_{RR1}) \times (x - X_{RL0}) + Y_{RL0}$$

$$L_3:\ y = (Y_{RL0} - Y_{FL2}/X_{RL0} - X_{FL2}) \times (x - X_{RL0}) + Y_{RL0}$$

$$L_4:\ y = (Y_{RR0} - Y_{FR2}/X_{RR0} - X_{FR2}) \times (x - X_{RR0}) + Y_{RR0}$$

The processor 162 may, upon concluding that there is no fusion track, generate a gate area based on single tracks for obstacles detected by the image acquirer and the plurality of distance detectors.

The processor 162 may obtain, as a reference single track, a single track for obstacle detected by a first camera among single tracks for obstacle detected by the image acquirer and the plurality of distance detectors, determine whether the reference single track is in a stationary state or a moving state based on movement information of the reference single track, and upon determining that the reference single track is a moving state, generate a first gate area $G_1$ based on reference position information and movement information of the reference single track in a moving state and preset second reference gate size information.

The processor 162 identifies the remaining single tracks present in the first gate area $G_1$ and recognizes a single track in a moving state among the identified remaining single tracks. Here, the remaining single tracks may be one or more single tracks.

For example, the processor 162 may recognize a single track CM1 present within a distance of $0.5 \times L_m$ or less in the first direction (i.e., the longitudinal) from the reference position of the reference single track CM0 and $0.5 \times W_m$ or less in the second direction (i.e., the lateral direction) from the reference position of the reference single track CM0.

$$Y_{mn} \leq 0.5 \times L_m, X_{mn} \leq 0.5 \times W_m$$

$$L_m = \min(L_m + Ka1, b1L_m), W_m = \min(W_m + Ka2, b2W_m)$$

a1, a2, b1, b2: tuning parameters
$C_{mn}$: the $n^{th}$ single track
$X_{mn}$: the relative longitudinal position from the reference position of the reference single track to the $n^{th}$ single track
$Y_{mn}$: the relative lateral position from the reference position of the reference single track to the $n^{th}$ single track The processor 162 identifies the movement velocity information of each of the identified one or more single tracks, and based on the movement velocity information of each of the single tracks and the movement velocity information of the reference single track in a moving state, recognizes at least one single track, of which the velocity difference with the reference single track is less than or equal to a reference velocity difference, and obtains position information of the recognized at least one single track.

$$|LongVel_n - LongVel_m| \leq \text{the first reference velocity}$$

$$|LatVel_n - LatVel_m| \leq \text{the second reference velocity}$$

$LongVel_n$: the longitudinal velocity of the $n^{th}$ single track
$LatVel_n$: the lateral velocity of the $n^{th}$ single track The processor 162 may obtain position information of a single track $C_{m1}$ in a moving state present in the first gate area $G_1$ of the reference single track $C_{m0}$.

The processor 162 may, upon determining that the reference single track is in a stationary state, generate a second gate area $G_2$ of the reference single track Cs0 based on reference position information of the reference single track Cs0 and second reference gate size information.

The second reference gate size information is preset information, and may include gate size information $L_s$ in the first direction and gate size information $W_s$ in the second direction thereof. Here, the first direction may be a longitudinal direction, and the second direction may be a lateral direction thereof.

The processor 162 identifies the remaining single tracks present in the generated gate area, and recognizes a single track in a stationary state among the identified remaining single tracks. Here, the remaining single tracks may be one or two or more single tracks.

The processor 162 obtains position information of the recognized single track.

The processor 162 may obtain the relative velocity information of each of the single tracks based on the travelling velocity information of the vehicle and the moving velocity information of each of the single tracks, and may recognize a single track $R_{s1}$ in a stationary state based on the obtained relative velocity information of each of the single tracks.

For example, the processor 162 may recognize a single track $C_n$ present within a distance of $0.5 \times L_s$ or less in the first direction (i.e., the longitudinal) from the reference position of the reference single track $C_{s0}$ and $0.5 \times W_s$ or less in the second direction (i.e., the lateral direction) from the reference position of the reference single track $C_{s0}$.

$$Y_{sn} \leq 0.5 \times L_s, X_{sn} \leq 0.5 \times W_s$$

$C_{sn}$: the $n^{th}$ single track
$X_{sn}$: the relative longitudinal position from the reference position of the reference single track in a stationary state to the $n^{th}$ single track
$Y_{sn}$: the relative lateral position from the reference position of the reference single track in a stationary state to the $n^{th}$ single track The processor 162 may identify position information of the corners of the first gate area of the reference single track, identify position information of the corners of gate areas adjacent to the first gate area, generate lines connecting corners of the first gate area and corners of the gate areas adjacent to the corners of the first gate area based on the position information of the corners of the first gate area and the position information of the corners of the gate areas adjacent to the corners of the first gate area, and obtain a cluster area including the generated lines as boundaries. This will be described with reference to FIG. 9 as an example.

The processor 162 may generate a different cluster area according to whether the reference single track is in a moving state or a stationary state.

The processor 162 may identify the position information of the corners of the first gate area $G_1$ of the reference single track $C_{m0}$ in a moving state, the position information of the corners of the second gate area $G_2$ of the first single track $C_{m1}$ in a moving state, and the position information of the corners of the third gate area $G_3$ of the second single track $R_{m1}$ in a moving state, and generate lines connecting the corners of the first gate area $G_1$ to the corners of the second gate area $G_2$ that are adjacent to the corners of the first gate area $G_1$, and generate lines connecting the corners of the first gate area $G_1$ to the corners of the third gate area $G_3$ that are adjacent to the corners of the first gate area $G_1$, and may obtain a cluster area including the generated lines as boundaries.

The processor 162 may identify the position information of the corners of the fourth gate area $G_4$ of the reference single track $C_{s0}$ in a stationary state, the position information of the corners of the fifth gate area $G_5$ of the third single track $R_{s1}$ in a stationary state, and the position information of the corners of the sixth gate area $G_6$ of the fourth single track $R_{s2}$ in a stationary state, generate lines connecting the corners of the fourth gate area $G_4$ to the corners of the fifth area $G_5$ that are adjacent to the corners of the fourth gate area $G_4$, and generate lines connecting the corners of the fourth gate area $G_4$ to the corners of the sixth gate area $G_6$ that are adjacent to the corners of the fourth gate area $G_4$, and obtain a cluster area including the generated lines as boundaries.

The processor 162 may obtain gradient information of the generated lines to obtain area information on the cluster region. This may be the same as the configuration of obtaining gradient of the first, second, third, and fourth lines described in FIG. 7.

The processor 162 may determine the validity of the obtained tracks present in the cluster area and a risk of collision with the vehicle 1, and control at least one of braking and steering based on the validity of tracks in the cluster area and the risk of collision.

When determining the validity of the tracks present in the obtained cluster area, the processor 162 determines whether there is a new track in the cluster area every predetermined time period, determines whether there is a track to be removed from the cluster area every predetermined time period, and upon determining that there is no track to be newly added to the cluster area or no track to be removed from the cluster area during a predetermined time period, determine the validity of the tracks in the obtained cluster area based on distance information between the tracks.

The processor 162 may, upon determining that there is a track newly added to the cluster area, determine the newly added track as invalid, and upon determining that there is a track removed from the cluster area, determine the removed track as invalid.

When there are a fusion track and single tracks in a cluster area, the processor 162 obtains distance information between the fusion track and each of the single tracks in the cluster area, and determines the validity of each single track based on the distance information.

The processor 162 may, upon determining that the distance between the fusion track and each of the single tracks is less than a reference distance in a predetermined time period, determine that the fusion track and all of the single tracks in the cluster area are valid, and when there is a single track away from the fusion track at a distance greater than or equal to the reference distance in the predetermined time period, determine that the single track is invalid.

Determining that a single track is invalid refers to determining that the single track is not an obstacle in cluster-travelling.

When there are a reference single track and at least one single track in a cluster area, the processor 162 obtains distance information between the reference single track and the at least one single track, and determines the validity of each of the at least one single track based on the distance information of the reference single track and the at least one single track.

The processor 162 may, upon determining that the distance between the reference single track and each of the at least one single tracks is less than a reference distance in a predetermined time period, determine that the reference single track and each of the at least one single tracks in the cluster area are valid, and when there is a single track away from the reference single track at a distance greater than or equal to the reference distance in the predetermined of time, determine that the single track is invalid. This will be described with reference to FIGS. 10A, 10B and 10C.

Referring to FIGS. 10A, 10B and 10C, the processor 162 obtains position information of tracks and area information of a cluster area at a first time point t−1 and a second time point t at which a predetermined time period has elapsed from the first time point t−1, and determines whether all of the tracks in the cluster area are unchanged or changed based on the position information of the tracks and the area information of the cluster area.

$$A(t-1)-A(t)=\emptyset,\ (A(t)=\{Oo,t,C_{1,t},C_{2,t}\}$$

Referring to FIG. 10A and FIG. 10B, the processor 162, upon determining that the tracks in the cluster area are all the same even after passage from the first time point t−1 to the second time point t, obtains position information of the fusion track O in the cluster area, the position information of the first single track $C_1$ in the cluster area, and the position information of the second single track $C_2$ in the cluster area at the first time point t−1, and obtains first distance information $L_{t-1,1}$ between the fusion track O and the first single track $C_1$ based on the position information of the fusion track O and the position information of the first single track $C_1$, and obtains second distance information $L_{t-1,2}$ between the fusion track O and the second single track $C_2$ based on the position information of the fusion track O and the position information of the second single track $C_2$.

$$L_{t-1,1}=\sqrt{(X_{O_{t-1,0}}-X_{C_{t-1,1}})^2+(Y_{O_{t-1,0}}-Y_{C_{t-1,1}})^2}$$

$$L_{t-1,2}=\sqrt{(X_{O_{t-1,0}}-X_{C_{t-1,2}})^2+(Y_{O_{t-1,0}}-Y_{C_{t-1,2}})^2}$$

The processor 162 obtains position information of the fusion track O in the cluster area, the position information of the first single track $C_1$ in the cluster area, and the position information of the second single track $C_2$ in the cluster area at the second time point t, and obtains first distance information $L_{t,1}$ between the fusion track O and the first single track $C_1$ based on the position information of the fusion track O and the position information of the first single track $C_1$, and obtains second distance information $L_{t,2}$ between the fusion track O and the second single track $C_2$ based on the position information of the fusion track O and the position information of the second single track $C_2$.

The processor 162 determines whether a difference in first distance between the first time point and the second time point is less than a reference distance based on the first distance information at the first time point and the first distance information at the second time point, determines whether a difference in second distance between the first time point and the second time point is less than a reference distance based on the second distance information at the first time point and the second distance information at the second time point, and upon determining that the difference in first distance is less than the reference distance and the difference in second distance is less than the reference distance, determines that both the first single track and the second single track are valid. That is, the processor is configured to determine that both the first single track and the second single track are obstacles in cluster-travelling, and control braking and steering based on the position information of the first single track, the position information of the second single track, and the position information of the fusion track.

The processor is configured to generate a signal of index T=1.

Referring to FIGS. 10A and 10C, the processor 162 may, upon determining that the difference in first distance is less than the reference distance and the difference in second distance is greater than or equal to the reference distance, determine that the first single track is valid and the second single track is invalid. That is, the processor 162 may determine that only the first single track is an obstacle in cluster-travelling, and control braking and steering based on the position information of the first single track and the position information of the fusion track.

The processor may control braking and steering based on area information of the cluster area.

Referring to FIG. 11, the processor 162 may obtain a TTC with the cluster area based on area information of the cluster area, velocity information of the cluster area, position information of the vehicle, and velocity information of the vehicle 1 obtained every predetermined time period (i.e., t, t+1, t+2), and upon determining that the TTC is less than a predetermined reference time, determine that there is a risk of collision and thus alert the driver to a collision, and transmit a braking signal to the brake device 152 or transmit a steering signal to the steering device 153.

The processor 162 may generate a signal of index C=1.

When index T is 1 and index C is 1, the processor 162 may control braking and steering.

Because the processor 162 determines the possibility of collision by obtaining the cluster area, so that the possibility of collision may be continuously and stably determined.

According to the exemplary embodiment of the present disclosure, because the cluster area is obtained based on a fusion track or a single track, robustness of collision determination may be secured even in a situation in which sensor fusion is not clear.

According to the exemplary embodiment of the present disclosure, the gate size of each track is adjusted by reflecting the dynamic characteristics of the vehicle when obtaining the cluster area, so that a collision may be flexibly responded to even in various travelling situations, such as straight travelling and turning of an obstacle.

According to the exemplary embodiment of the present disclosure, a track for obtaining a cluster area includes not only vehicles and motorcycles but also general obstacles (cones), which may be recognized by a single sensor, and thus collisions may be determined in various road environments.

The processor 162 may include a memory for storing data regarding an algorithm for implementing the operations of the ADAS 160 or a program that represents the algorithm, and a processor that performs the above-described operations using the data stored in the memory.

The processor 162 may include a memory for storing data regarding an algorithm for controlling the operations of the components of the vehicle or a program that represents the algorithm, and a processor that performs the above-described operations using the data stored in the memory. In the instant case, the memory and the processor may be implemented as separate chips. Alternatively, the memory and the processor may be implemented as a single chip.

The memory 163 may store information related to first and second reference gate sizes, first and second reference velocities, tuning parameters, predetermined reference distances, and predetermined reference times.

The memory 163 may store a program for determining the possibility of collision.

The memory 163 may store a program for performing an autonomous driving mode and may store a program for performing a navigation mode.

The memory 163 may store a plurality of recognition areas for obstacle recognition.

The memory 163 may store image information related to the shape of obstacles.

The memory 163 may be a memory implemented as a chip separate from the processor described above in connection with the processor 162, or may be implemented as a single chip with the processor.

The memory 163 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a Hard Disk Drive (HDD), a CD-ROM, and the like, but the implementation of the memory 163 is not limited thereto. The storage may be a memory implemented as a chip separate from the processor described above in connection with the controller, or may be implemented as a single chip with the processor.

Meanwhile, the components shown in FIG. 3 may refer to a software component and/or a hardware component, such as a Field Programmable Gate Array (FPGA) and an Application Specific Integrated Circuit (ASIC).

Meanwhile, the disclosed exemplary embodiments of the present disclosure may be embodied in a form of a recording medium storing instructions executable by a computer. The instructions may be stored in a form of program code, and when executed by a processor, may generate a program module to perform the operations of the disclosed exemplary embodiments of the present disclosure. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the present disclosure is implemented to obtain a cluster area based on a fusion track or a reference single track, so that robustness of collision determination may be secured even when sensor fusion is not clear.

The present disclosure is implemented to determine the possibility of collision based on a cluster area, so that the accuracy of collision determination and the accuracy of braking control and avoidance control may be improved.

The present disclosure is implemented to adjust the gate size of each track by reflecting dynamic characteristics of the vehicle when obtaining a cluster area, so that a collision may be flexibly responded even in various traveling situations, such as straight travelling and turning of an obstacle.

The exemplary embodiment of the present disclosure is implemented to include not only vehicles and motorcycles but also general obstacle (cones), which may be recognized by a single sensor, as a track for obtaining a cluster area, collisions may be determined in various road environments.

The present disclosure is implemented to output information related to an obstacle as notification information, so that the appearance of an obstacle may be flexibly responded, so that travelling safety may be improved.

The present disclosure is implemented to recognize an obstacle and output notification information related to the recognized obstacle without hardware configuration added, preventing an increase in the cost of the vehicle while improving the stability of the vehicle.

As described above, according to the present disclosure, the marketability of the ADAS and the vehicle may be improved, user satisfaction may be improved, and product competitiveness may be secured.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An advanced driver assistance system (ADAS) comprising:
    a communicator configured to communicate with a camera and a plurality of distance detectors; and
    a processor operatively connected to the communicator and configured to:
        determine whether a fusion track is present based on obstacle information recognized by the camera and obstacle information recognized by at least one of the plurality of distance detectors;
        upon concluding that the fusion track is present, generate a gate area of the fusion track based on movement information of the fusion track and reference position information of the fusion track;
        generate a cluster area based on the gate area of the fusion track, position information of a plurality of single tracks, and movement information of the plurality of single tracks; and
        determine a possibility of collision based on the generated cluster area.

2. The ADAS of claim 1, wherein the processor is further configured to:
    determine whether the fusion track is in a stationary state based on the movement information of the fusion track, and upon concluding that the fusion track is in the stationary state, generate the gate area of the fusion track based on first reference gate size information.

3. The ADAS of claim 2, wherein the processor is further configured to:
    upon concluding that the fusion track is in the stationary state, recognize single tracks in the stationary state based on the movement information of the plurality of single tracks; based on position information of the recognized single tracks in the stationary state and the reference position information of the fusion track, recognize at least one single track which is present in a range less than or equal to a reference distance from the fusion track; and
    obtain the cluster area based on position information of the recognized at least one single track.

4. The ADAS of claim 3, wherein the processor is further configured to:
    based on the position information of the recognized at least one single track, generate a gate area of the recognized at least one single track;
    generate a line connecting a corner of the gate area of the fusion track and a corner of the gate area of the at least one single track that are provided adjacent to each other; and
    obtain the cluster area using the generated line as a boundary.

5. The ADAS of claim 4,
    wherein, based on whether the at least one single track at a first time point is a same as the at least one single track at a second time point, and a change in distance between the fusion track and the at least one single track corresponding to a change in time from the first time point to the second time point, the processor is further configured to determine cluster validity for the at least one single track, and
    wherein the second time point is a time at which a predetermined time period has elapsed from the first time point.

6. The ADAS of claim 1, wherein the processor is further configured to:
    determine whether the fusion track is in a moving state based on the movement information of the fusion track;
    upon concluding that the fusion track is in the moving state, obtain first gate size information and second gate size information based on a velocity in a first direction of the fusion track, a velocity in a second direction of the fusion track, and first reference gate size information;
    generate a first gate area based on the obtained first gate size information, and
    generate a second gate area based on the obtained second gate size information.

7. The ADAS of claim 6, wherein the processor is further configured to:
    upon concluding that the fusion track is in the moving state, identify single tracks located within the first gate area based on the position information of the plurality of single tracks; and
    based on the movement information of the single tracks within the first gate area, a velocity of the fusion track in a first direction, and the generated first gate area, recognize a first single track, of which a velocity difference from the fusion track is less than or equal to a first reference velocity, among the single tracks in the moving state within the first gate area.

8. The ADAS of claim 7, wherein the processor is further configured to:
    upon concluding that the fusion track is in the moving state, identify single tracks located within the second gate area based on the position information of the single tracks; and
    based on the movement information of the single tracks within the second gate area, a velocity of the fusion track in a second direction, and the generated second gate area, recognize a second single track, of which a velocity difference from the fusion track is less than or equal to a second reference velocity, among the single tracks in the moving state within the second gate area.

9. The ADAS of claim 8, wherein the processor is further configured to:
generate a gate area of the first single track and a gate area of the second single track; and
generate a line connecting a corner of the gate area of the fusion track and a corner of the gate area of the first single track that are provided adjacent to each other, and generate a line connecting a corner of the gate area of the fusion track and a corner of the gate area of the second single track that are provided adjacent to each other, to obtain the cluster area.

10. The ADAS of claim 1, wherein the processor is further configured to:
upon concluding that there is no fusion track, set a track recognized by the camera among the plurality of single tracks as a reference single track;
determine whether the reference single track is in a stationary state based on movement information of the reference single track; and
upon concluding that the reference single track is in the stationary state, generate a gate area of the reference single track based on reference position information of the reference single track and reference gate size information of the reference single track.

11. The ADAS of claim 10, wherein the processor is further configured to:
upon concluding that the reference single track is in the stationary state, recognize single tracks in the stationary state based on movement information of remaining single tracks among the plurality of single tracks;
based on position information of the recognized single tracks in the stationary state and the reference position information of the reference single track, recognize at least one single track which is present in a range less than or equal to a reference distance from the reference single track; and
obtain the cluster area based on position information of the recognized at least one single track.

12. The ADAS of claim 11, wherein the processor is further configured to:
based on the position information of the recognized at least one single track, generate a gate area of the recognized at least one single track;
generate a line connecting a corner of the gate area of the reference single track and a corner of the gate area of the at least one single track that are provided adjacent to each other; and
obtain the cluster area using the generated line as a boundary.

13. The ADAS of claim 12,
wherein, based on whether the at least one single track at a first time point is a same as the at least one single track at a second time point, and a change in distance between the reference single track and the at least one single track corresponding to a change in time from the first time point to the second time point, the processor is further configured to determine cluster validity for the at least one single track, and
wherein the second time point is a time at which a predetermined time period has elapsed from the first time point.

14. The ADAS of claim 10, wherein the processor is further configured to:
determine whether the referenced single track is in a moving state based on the movement information of the referenced single track; and
upon concluding that referenced single track is in the moving state, generate the gate area of the reference single track based on a velocity in a first direction of the reference single track, a velocity in a second direction of the referenced single track, and the reference gate size information.

15. The ADAS of claim 14, wherein the processor is further configured to:
upon concluding that the reference single track is in the moving state, identify single tracks in the moving state based on movement information of remaining single tracks among the plurality of single tracks; and
based on position information of the identified single tracks in the moving state, recognize single tracks in the moving state, which are located within the gate area of the reference single track, among the identified single tracks in the moving state.

16. The ADAS of claim 15, wherein the processor is further configured to:
based on the movement information of the recognized single tracks in the moving state and the movement information of the reference single track, recognize a single track in the moving state, of which a velocity difference from the reference single track is less than or equal to a reference velocity, among the recognized single tracks in the moving state; and
generate a gate area of the recognized single track in the moving state and generate a line connecting a corner of the gate area of the reference single track and a corner of the gate area of the recognized single track in the moving state that are adjacent to each other, to obtain the cluster area.

17. The ADAS of claim 16, wherein the processor is further configured to, based on whether the recognized single track in the moving state at a first time point is a same as the recognized single track in the moving state at a second time point, and a change in distance between the reference single track and the recognized single track in the moving state corresponding to a change in time from the first time point to the second time point, determine cluster validity for the recognized single track in the moving state,
wherein the second time point is a time at which a predetermined time period has elapsed from the first time point.

18. A vehicle comprising:
a camera;
a plurality of distance detectors;
a braking device; and
a processor operatively connected to the camera, the plurality of distance detectors and the braking device, and configured to:
recognize a fusion track and a plurality of single tracks based on obstacle information recognized by the camera and obstacle information recognized by at least one of the plurality of distance detectors;
upon concluding that the fusion track is present, obtain a cluster area in a stationary state and a cluster area in a moving state based on movement information and reference position information of the fusion track and movement information and position information of each of the single tracks; and determine a possibility of collision based on the obtained cluster area, wherein the processor is further configured to:
  upon concluding that the fusion track is present, generate a gate area of the fusion track, generate a gate area of at least one single track among the plurality of single tracks based on the gate area of the fusion track, and obtain the cluster area using the gate area of the fusion track and the gate area of the at least one single track; and
  upon concluding that the fusion track is not present, set a single track recognized by the camera among the plurality of single tracks as a reference single track, generate a gate area of the reference single track, generate gate areas of remaining at least one single track among the plurality of single tracks based on the gate area of the reference single track, and obtain the cluster area using the gate area of the reference single track and the gate area of the remaining at least one single track.

19. The vehicle of claim 18, wherein the processor is further configured to,
  based on whether the at least one single track at a first time point is a same as the at least one single track at a second time point, and a change in distance between the fusion track and the at least one single track corresponding to a change in time from the first time point to the second time point, determine cluster validity for the at least one single track,
wherein the second time point is a time at which a predetermined time period has elapsed from the first time point.

20. The vehicle of claim 18,
wherein the processor is further configured to,
  based on whether the remaining at least one single track at a first time point is a same as the remaining at least one single track at a second time point, and a change in distance between the reference single track and the remaining at least one single track corresponding to a change in time from the first time point to the second time point, determine cluster validity for the remaining at least one single track, and
wherein the second time point is a time at which a predetermined time period has elapsed from the first time point.

* * * * *